United States Patent
Meurer

(10) Patent No.: US 7,560,035 B1
(45) Date of Patent: Jul. 14, 2009

(54) OVERHEAD TROUGH WITH CONSTANT TROUGH FLOW VELOCITY CONFIGURATION AND METHODS OF REGULATING TROUGH FLOW VELOCITY

(76) Inventor: Charles Lonnie Meurer, 2389 Bitterroot La., Golden, CO (US) 80401

( * ) Notice: Subject to any disclaimer, the term of this patent is extended or adjusted under 35 U.S.C. 154(b) by 31 days.

(21) Appl. No.: 11/821,254

(22) Filed: Jun. 22, 2007

(51) Int. Cl.
*B01D 21/24* (2006.01)

(52) U.S. Cl. ............... 210/801; 210/532.1; 210/540; 210/541; 210/522; 137/561 A

(58) Field of Classification Search ............... 210/800, 210/801, 519, 532.1, 538, 540, 541, 802, 210/521, 522; 137/561 A, 561 R
See application file for complete search history.

(56) References Cited

U.S. PATENT DOCUMENTS

| | | |
|---|---|---|
| 630,962 A | 8/1899 | Wood |
| 747,113 A | 12/1903 | Allen |
| 748,981 A | 1/1904 | Oliver |
| 1,102,463 A | 7/1914 | Wyckoff |
| 1,493,861 A | 5/1924 | Kusch |
| 1,543,621 A | 6/1925 | Ruckstuhl |
| 1,557,340 A | 10/1925 | Sandmann |
| 1,703,967 A | 3/1929 | Sperr, Jr. |
| 1,717,713 A | 6/1929 | Logan |
| 1,793,510 A | 2/1931 | Raymond |
| 1,918,742 A | 7/1933 | Elrod |
| 2,144,385 A | 1/1939 | Nordell |
| 2,242,139 A | 5/1941 | Monroe |
| 2,302,450 A | 11/1942 | Laughlin |
| 2,314,977 A | 3/1943 | Green |
| 2,328,655 A | 9/1943 | Lannert |
| 2,379,615 A | 7/1945 | Walker |
| 2,502,187 A | 3/1950 | Wahlgren |
| 2,589,882 A | 3/1952 | Sinner et al. |
| 2,640,682 A | 6/1953 | Votypka |
| 2,650,810 A | 9/1953 | Nordell |
| 2,684,330 A | 7/1954 | French |

(Continued)

FOREIGN PATENT DOCUMENTS

| | | |
|---|---|---|
| GB | 742315 | 12/1955 |
| GB | 1329599 | 9/1973 |

OTHER PUBLICATIONS

Hazen: On Sedimentation, 1904, Transaction of the American Society of Civil Engineers, vol. 53, pp. 45-88.

*Primary Examiner*—Christopher Upton
(74) *Attorney, Agent, or Firm*—Sheridan Ross P.C.

(57) ABSTRACT

Trough sides enclosing clarified liquid to be guided, and a trough septum, promote efficient clarifier operation. A first side has a liquid outlet, a second side is spaced from and opposite to the first side, and third and fourth sides extend spaced from each other between the first and second sides. The septum extends from the first side to a termination, and extends at an angle with respect to the third and fourth sides. Septum configuration divides the trough into a flow path from the first side to and around the termination back to the first side. The path extends sequentially over clarifier orifices in one row then over clarifier orifices in a next row along a path length. A path area is regulated along the length in direct proportion to length values so the trough flow velocity is constant all along the path.

25 Claims, 13 Drawing Sheets

U.S. PATENT DOCUMENTS

| | | |
|---|---|---|
| 2,897,976 A | 8/1959 | Arthur |
| 2,930,485 A | 3/1960 | Nordell |
| 2,947,525 A | 8/1960 | Klein |
| 2,961,100 A * | 11/1960 | Lind et al. .................. 210/519 |
| 2,997,284 A | 8/1961 | Nechine |
| 3,063,689 A | 11/1962 | Coppock |
| 3,083,953 A | 4/1963 | Langdon et al. |
| 3,134,324 A | 5/1964 | Schwaninger |
| 3,321,185 A | 5/1967 | Zenke |
| 3,333,704 A | 8/1967 | McGivern |
| 3,353,683 A | 11/1967 | Geiger |
| 3,416,176 A | 12/1968 | Ravitts |
| 3,494,462 A | 2/1970 | Baud |
| 3,613,564 A | 10/1971 | Adamski et al. |
| 3,613,889 A | 10/1971 | Reed |
| 3,616,651 A | 11/1971 | Chang et al. |
| 3,669,271 A | 6/1972 | McGivern |
| 3,706,384 A | 12/1972 | Weijman-Hane |
| 3,707,737 A | 1/1973 | Brower |
| 3,717,257 A * | 2/1973 | Boyle ......................... 210/521 |
| 3,802,676 A | 4/1974 | Thayer |
| 3,846,291 A | 11/1974 | Brucker |
| 3,864,441 A | 2/1975 | Suzuki |
| 3,872,960 A | 3/1975 | Gabor |
| 3,880,965 A | 4/1975 | Dudis et al. |
| 3,903,000 A | 9/1975 | Miura et al. |
| 3,925,205 A | 12/1975 | Sparham |
| 3,963,624 A | 6/1976 | Henderson et al. |
| 3,980,561 A | 9/1976 | Miyagi et al. |
| 3,985,207 A | 10/1976 | Petit |
| 4,002,105 A | 1/1977 | Bell |
| 4,048,267 A | 9/1977 | Walker et al. |
| 4,049,553 A * | 9/1977 | Stebbins et al. ............. 210/540 |
| 4,071,443 A | 1/1978 | Gorski et al. |
| 4,090,966 A | 5/1978 | Clendenen |
| 4,136,012 A | 1/1979 | Louboutin et al. |
| 4,148,731 A | 4/1979 | Brigante |
| 4,193,871 A | 3/1980 | White et al. |
| 4,194,976 A | 3/1980 | Robinsky |
| 4,198,871 A | 4/1980 | Dunn et al. |
| 4,221,671 A | 9/1980 | Meurer |
| 4,245,396 A | 1/1981 | Maffet |
| 4,246,102 A | 1/1981 | Hjelmner et al. |
| 4,294,696 A | 10/1981 | Thayer |
| 4,346,005 A | 8/1982 | Zimmerman |
| 4,401,335 A | 8/1983 | Godbersen |
| 4,401,576 A | 8/1983 | Meurer |
| 4,431,597 A | 2/1984 | Cramer et al. |
| 4,477,939 A | 10/1984 | White et al. |
| 4,514,303 A | 4/1985 | Moore |
| 4,551,246 A | 11/1985 | Coffing |
| 4,555,340 A | 11/1985 | Boyle |
| 4,859,327 A | 8/1989 | Cox et al. |
| 4,865,753 A | 9/1989 | Meurer |
| 4,886,605 A | 12/1989 | Herve |
| 4,889,624 A | 12/1989 | Soriente et al. |
| 4,926,973 A | 5/1990 | Smith |
| 4,933,524 A | 6/1990 | Meurer |
| 4,957,014 A | 9/1990 | Burke |
| 4,957,628 A | 9/1990 | Schulz |
| 4,960,546 A | 10/1990 | Tharp |
| 4,986,141 A | 1/1991 | Meurer |
| 4,988,441 A | 1/1991 | Moir |
| 5,013,435 A | 5/1991 | Rider et al. |
| 5,013,493 A | 5/1991 | Tharp |
| 5,018,925 A | 5/1991 | Ganser |
| 5,021,153 A | 6/1991 | Haws |
| 5,059,312 A | 10/1991 | Galletti |
| 5,087,391 A | 2/1992 | Brown |
| 5,100,545 A * | 3/1992 | Brooks ....................... 210/540 |
| 5,116,443 A | 5/1992 | Meurer |
| 5,120,436 A | 6/1992 | Reichner |
| 5,125,931 A | 6/1992 | Schulz |
| 5,132,010 A | 7/1992 | Ossenkop |
| 5,143,625 A | 9/1992 | Ballard |
| 5,160,460 A | 11/1992 | Goetz et al. |
| 5,204,000 A | 4/1993 | Steadman et al. |
| 5,217,614 A | 6/1993 | Meurer |
| 5,290,487 A | 3/1994 | Ludwig |
| 5,300,220 A * | 4/1994 | McEwen .................... 210/154 |
| 5,300,232 A | 4/1994 | Barrington et al. |
| 5,366,638 A | 11/1994 | Moore |
| 5,378,378 A | 1/1995 | Meurer |
| 5,388,480 A | 2/1995 | Townsend |
| 5,391,306 A | 2/1995 | Meurer |
| 5,427,471 A | 6/1995 | Godbersen |
| 5,435,924 A | 7/1995 | Albertson |
| 5,497,854 A | 3/1996 | Fang |
| 5,510,025 A | 4/1996 | Benesi |
| 5,552,050 A | 9/1996 | Valentin |
| 5,558,780 A * | 9/1996 | Vancas ....................... 210/801 |
| 5,655,727 A | 8/1997 | Hanson et al. |
| 5,692,435 A | 12/1997 | Nissen |
| 5,693,323 A | 12/1997 | Ames, Jr. et al. |
| 5,804,104 A | 9/1998 | Brauch et al. |
| 5,830,356 A | 11/1998 | Kauppila |
| 5,945,040 A | 8/1999 | Brauch et al. |
| 6,045,709 A | 4/2000 | Roberts |
| 6,086,058 A | 7/2000 | Brauch et al. |
| 6,129,215 A | 10/2000 | Brauch et al. |
| 6,158,142 A | 12/2000 | Brauch et al. |
| 6,234,323 B1 | 5/2001 | Sarrouh |
| 6,245,243 B1 | 6/2001 | Meurer |
| 6,426,009 B1 | 7/2002 | Meurer et al. |
| 6,497,249 B1 | 12/2002 | Swan et al. |
| 6,537,458 B1 * | 3/2003 | Polderman .................. 210/519 |
| 6,817,476 B2 * | 11/2004 | Donnick et al. ............. 210/540 |
| 6,951,620 B2 | 10/2005 | Brauch et al. |
| 6,971,398 B1 | 12/2005 | Brauch et al. |
| 7,021,471 B2 | 4/2006 | Abrams |
| 7,021,472 B1 | 4/2006 | Meurer |
| 7,159,724 B2 | 1/2007 | Brauch et al. |

* cited by examiner

US 7,560,035 B1

OVERHEAD TROUGH WITH CONSTANT TROUGH FLOW VELOCITY CONFIGURATION AND METHODS OF REGULATING TROUGH FLOW VELOCITY

BACKGROUND

Clarifiers (also known as "settlers") are used in attempts to efficiently remove certain materials and particles (herein "materials") from liquid. These materials are generally suspended in the liquid and can be removed under the force of gravity when the volumetric flow rate of the liquid is substantially reduced, as in an individual very low flow, or quiescent, flow path (or settling flow path) in the clarifier. Since these materials are generally solid and are said to "settle" out of the liquid, they are referred to as "settleable solids". Such settleable solids may include naturally occurring materials (e.g., clay, silt, sand and dirt), chemical precipitants and biological solids. The word "solids" as used herein to describe the present invention refers to such settleable solids.

Clarifiers are used, for example, in water and waste water treatment plants. In water treatment, the water drawn from a water supply has various non-settleable colloidal solids therein. When mixed with chemicals, the colloidal solids and chemicals agglomerate to form solids. In waste water treatment, the solids include organic solids, among other wastes. Water and waste water are treated in clarifiers to remove such solids, thereby making the water clear and suitable for use, reuse, or for further treatment, such as tertiary treatment. The word "liquid" as used herein to describe the present invention refers to water and waste water.

Water and waste water clarifiers attempt to create the settling flow paths, with each individual settling low path having a very low volumetric flow rate (e.g., in a range of from about two to six gallons per minute (GPM). The attempt is to promote maximum settlement of solids to the bottom of the clarifiers for a particular total volumetric flow rate of water or waste water into the entire settler, and thus attempt to promote high settling efficiency. The attempts include clarifiers configured with tubes or flat plates mounted in a basin. Mounting exemplary plates at fixed angles relative to the surface of the liquid forms multiple ones of the settling flow paths in the basin. A goal is for the liquid containing the solids to flow upwardly in each particular settling flow path between such plates (referred to as "settling flow") at a very low flow rate that allows sufficient time for most of the solids to settle onto one of the plates. Ideally, the solids then slide down the plate to the bottom of the basin for collection. After the solids have settled, the liquid without the settled solids is referred to as "clarified liquid". The clarified liquid flows upwardly past the plates and out of an open top (or "clarifier exit") of each settling flow path. Such open top is between and at the top of the exemplary adjacent plates, or at the top of an exemplary tube.

Generally, the clarified liquid from each of the separate settling flow paths may combine in a trough above the clarifier. The combined clarified liquid flows in the trough to a trough outlet at an end of the basin for exit from the basin. However, problems have been experienced in the use of such troughs that receive the settling flows from the individual settling flow paths of the clarifiers. For example, it has been observed that in many instances clarifier efficiencies have been significantly less than planned or expected based on design criteria.

In view of the forgoing, there is a need to achieve clarifier efficiencies that are as planned or expected based on design criteria, e.g., planned as high settling efficiencies. There is thus a need for avoiding reduction of clarifier efficiency and for avoiding the attendant reduced settling of solids for a given inflow of solids and liquid to the settling flow paths. There is also a related need to avoid having more of the solids flow out of the settling flow paths in low efficiency clarifiers than in high efficiency clarifiers.

SUMMARY

Broadly speaking, embodiments of the present invention (referred to herein as "embodiments") fill these needs by providing clarifier efficiencies that are as planned or expected based on design criteria, e.g., high. There are thus provided ways of avoiding reduction of clarifier efficiency by maintaining proper amounts of settling of solids for the given inflow of solids and liquid to the settling flow paths. As a result, such embodiments reduce the amounts of the solids flowing out of the settling flow paths for the given inflows of solids and liquid.

In these embodiments ways are provided to assure a uniform (or constant) trough flow velocity of clarifier liquid in a trough above tops (or exits) from individual settling flow paths of a clarifier. The uniform trough flow velocity promotes a constant (or uniform) pressure head above each of those exits. In turn, each one of the individual settling flow paths has a volumetric flow rate that is essentially the same as the volumetric flow rates through all of the other individual settling flow paths. In this manner, clarifier efficiencies may be as planned or expected based on design criteria, e.g., high.

It should be appreciated that the present invention can be implemented in numerous ways, including as an apparatus, a method, a system, and systems for use. Several inventive embodiments of the present invention are described below.

In one embodiment, a trough is provided for guiding clarified liquid. A container may be configured with sides to enclose the liquid to be guided. A first side may be configured with an outlet for the liquid. A second side may be being spaced from and opposite to the first side. Third and fourth sides may extend spaced from each other and extend between the first and second sides. At least one septum may extend from the first side to a termination spaced from the second side. The at least one septum extends at an angle with respect to the third and fourth sides. The at least one septum may be configured to divide the container into at least one trough flow path starting at the first side and extending to the termination. The at least one trough flow path may further extend around the termination and back to the first side.

In another embodiment, apparatus is provided for guiding clarified liquid. The apparatus may include a clarifier for settling solids from liquid in a plurality of separate settling flow paths, and for providing the clarified liquid. Each of the paths is configured with a width, defining the flow path width and the width of the clarifier. The plurality of paths define a length of the clarifier. A plurality of arrays of orifices may be provided. Each array is configured extending along the clarifier length, with a different one of the orifices aligned with a different one of the settling flow paths. Each array is spaced across the flow path width and is away from all of the other arrays. Each orifice is configured to discharge clarified liquid to be guided from the apparatus. A trough may overlie the length and width and may be configured with sides to receive and enclose the clarified liquid to be guided. A first side is configured with an outlet for the liquid. A second side is spaced from and opposite to the first side. Third and fourth sides extend spaced from each other and extend between the first and second sides. At least one septum extends from the first side to a termination spaced from the second side. The at least one septum extends at an angle with respect to the third and fourth sides. The at least one septum is configured to divide the container into at least one continuous trough flow path extending from the first side to the termination and around the termination to the liquid outlet.

In still another embodiment, a method is provided for using a trough to supply clarified liquid from a clarifier. The method may include an operation of providing the trough with first, second, third and fourth sides to enclose the liquid to be guided. The first side may be configured with a liquid outlet. The trough may have a septum extending from the first side to a termination spaced from the second side, the septum extending at an angle with respect to the third and fourth sides. The septum divides the trough into at least one continuous trough flow path configured into a first section and a second section, each section having a flow area that increases in direct proportion to increased length of the flow path. An operation may flow clarified liquid from the clarifier into the trough through rows of orifices. Each orifice has the same area, one row of orifices flowing liquid into the first trough flow path section, another row of orifices flowing liquid into the second trough flow path section. An operation may regulate a volumetric flow rate of the clarified liquid through each orifice into the trough flow path, the regulating is effective to regulate a trough flow velocity through the liquid outlet using the septum to guide the clarified liquid in the at least one trough flow path sequentially over the one row of orifices then over the other row of orifices and then through the liquid outlet.

In yet another embodiment, a method is provided for supplying clarified liquid from a clarifier. The method may include an operation of flowing clarified liquid from the clarifier into a trough through rows of orifices, each orifice having the same area. An operation may also regulate the flow rate through each orifice by defining a flow path of the trough, the trough flow path extending sequentially over one row then over a next row along a path length. The regulating may be by varying an area of the trough flow path along the length, the varying being in direct proportion to values of the length so that the flow of the liquid is at the same volumetric flow rate through each orifice and into the trough flow path and at a constant trough flow velocity all along the trough flow path.

Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1:
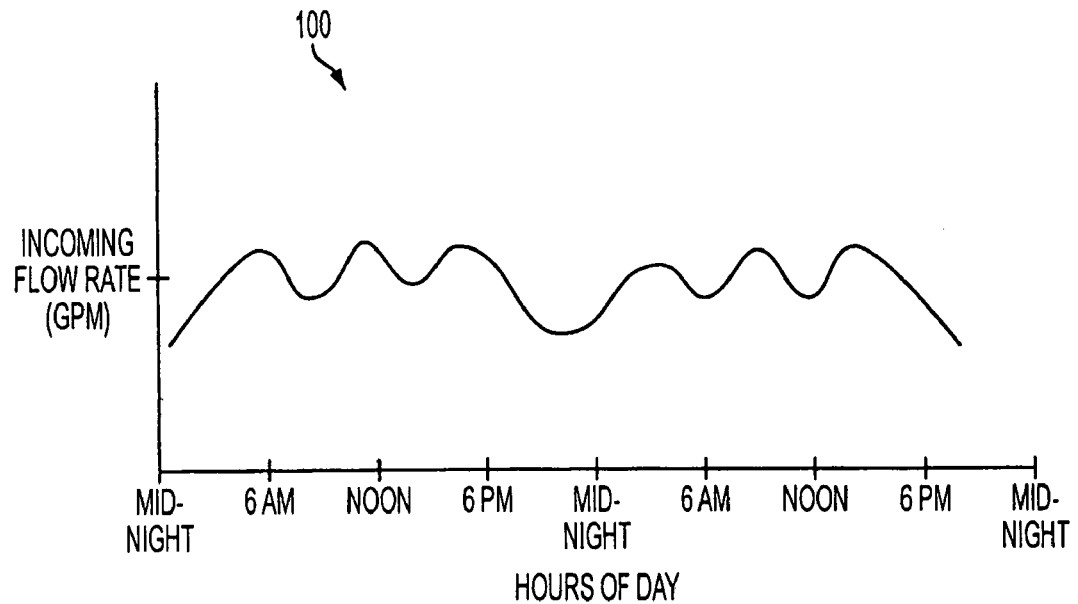
FIG. 1 illustrates a graph showing an exemplary range of a volumetric flow rate of an incoming flow of water or wastewater to a settling basin.

An invention is described for a clarifier, a trough, methods for using, apparatus, and methods for supplying clarified liquid from a clarifier, to provide efficiencies that are as planned or expected based on design criteria. The embodiments may regulate the volumetric rate of liquid received from separate settling flow paths of a clarifier, which liquid may be used in the wastewater or water purification industry. In this manner, clarifier efficiencies that are planned (or expected based on design criteria) to be high may desirably be high in actual operation.

In one embodiment, the liquid is defined as water or wastewater that can be processed and then used in the supply of water for industrial or municipal purposes. A "clarifier," as an example used herein, denotes without limitation, structure used to separate an incoming flow of liquid into many individual settling flow paths of the liquid. The individual settling flow paths are oriented so that the action of gravity on the settleable particles settles the particles out of each path as the liquid without the particles continues to flow through each path. The settling action in the clarifier thus characterizes the paths as "settling flow paths". The liquid without the particles exits from the settling flow paths and is referred to as the "clarified liquid". Clarifiers may be of the type referred to as "plate settlers", or "tube settlers", for example, which cause settleable particles to become separated from incoming solids-laden liquid, so that the liquid without the solids (i.e., the clarified liquid) exits (or is discharged from) each separate settling flow path of the clarifier. Depending on the actual application, the clarifier may be in any one of these exemplary configurations, and the clarified liquid may be received from each separate settling flow path of the clarifier for purposes of the present invention.

I. SYSTEM AND METHOD DESIGN CONSIDERATIONS

In describing clarified liquid received from the clarifier for purposes of the present invention, in the experience of the Applicant of the embodiments, troughs have been used to receive the liquid from clarifiers. A trough defines a space in which a volume of clarified liquid is collected. The space may be said to be "common" in that above the exits of the settling flow paths, the volume of clarified liquid from all of the individual settling flow paths mixes in the trough. Such Applicant's analysis indicates that the mixed settling flow "freely" flows in the trough to the trough outlet. This freely flowing clarified liquid may be referred to as "trough flow" (or "free trough flow") to distinguish from the settling flow that occurs in each of the individual settling flow paths. Such Applicant has observed a drawback in the use of such troughs, however, in that as the clarified liquid freely flows in the trough past more and more of the exits of more and more of the individual settling flow paths on the way to the trough outlet, the trough flow velocity of the free trough flow increases on the way to the trough outlet. Such Applicant has concluded that as a result of this drawback, there are unequal pressure heads at the tops of the individual settling flow paths. The pressure heads vary according to the trough flow velocity of the free trough flow past the exit of each particular settling flow path on the way to the trough outlet. Such Applicant has also concluded that a drawback of the gain in the trough flow velocity of the free trough flow, and of the resultant unequal pressure heads, relates to the volumetric flow rate of the flow of the liquid in each of the settling flow paths (i.e., referred to herein as the "volumetric settling flow rate"). Such Applicant has further concluded that the settling flow paths having exits at which the trough flow velocity of the free trough flow in the trough is high tend to have an increased volumetric settling flow rate of settling flow. Also, the increased volumetric settling flow rate of the settling flow is higher than the volumetric settling flow rates in settling flow paths having exits at which the trough flow velocity of the free trough flow is lower. Such Applicant has additionally concluded that in the settling flow paths with increased volumetric settling flow rate (herein "low efficiency settling paths"), another drawback is that there is less settling, i.e., less removal of solids for a given inflow of solids to the settling flow path, and thus more solids flowing out of the settling flow path having the increased volumetric settling flow rate. Also, such Applicant has finally concluded that another drawback is that the increased volumetric settling flow rate in one low efficiency settling path tends to disturb the volumetric settling flow rates in the other settling flow paths, such that the operating efficiency of the clarifier is reduced.

By this analysis, such Applicant of the embodiments has determined that, to provide clarifier efficiencies that are desirably as planned or expected based on design criteria, it is necessary to provide ways to assure that a constant, or uniform, trough flow velocity of clarifier liquid exists above exits of all of the individual settling flow paths of the clarifier. The determination is also that the constant trough flow velocity promotes having the same pressure head above each of those exits. The same pressure head in turn fosters having the same volumetric settling flow rate in each of the settling flow paths as the volumetric settling flow rate through each of the other individual settling flow paths. As a result of these determinations, the embodiments are configured to avoid having any individual settling flow path with an increased volumetric settling flow rate (i.e., to avoid low efficiency settling paths). Also, by avoiding increased volumetric settling flow rate in one low efficiency settling path, there is no disturbance of the volumetric settling flow rates in the other settling flow paths, such that the operating efficiency of the clarifier is maintained desirably as planned or expected based on design criteria, e.g., high. Embodiments improving on the drawbacks noted above are now described in greater detail below.

II. DETAILED DESCRIPTION OF EMBODIMENTS

Depending on the actual application, the clarifier may be in either of the above exemplary configurations, and the clarified liquid may be received from the clarifier for purposes of the present invention. "Regulating", broadly defined, includes the configuring of structure, and directing and guiding of the liquid, and in particular, the managing of the flow of the liquid in a trough flow path through the trough. By the managing, in the embodiments, as clarified liquid is received from successive individual clarifier settling flow paths through arrays of orifices over which the trough flow path is directed, the regulating increases a value of the trough flow area. The increase is directly proportional to increased length along the trough flow path, so that the trough flow velocity of the regulated liquid in the trough flow path stays constant all along the way to the trough outlet. A "constant" trough flow velocity (of the liquid in the trough flow path) is defined with respect to a particular height of the regulated liquid flowing in the trough, and is a trough flow velocity that is within a narrow desired range of trough flow velocities that are to exist all along the length of the trough flow path to the trough outlet. This narrow range may be a trough flow velocity of from about one to about two feet per second (of the regulated liquid in the trough flow path all along the way to the trough outlet). For example, for an exemplary height of about twelve inches of the regulated liquid flowing in a trough having a five foot wide outlet, and with an exemplary trough flow velocity of two feet per second (of the regulated liquid in the trough flow path all along the way to the trough outlet), the volumetric flow rate out of the trough outlet may be 4,500 GPM. Also, this range of trough flow velocity may result in an acceptable range of volumetric settling flow rates of from about two to six GPM in each individual settling flow path. As used herein, the "same" volumetric settling flow rates are such rates that are within the range of from about two to about six GPM in each individual settling flow path. These ranges are applicable to an incoming volumetric flow rate of from about 4,000 to about 10,000 GPM of solids-laden liquid incoming to the basin, wherein such solids-laden liquid incoming to the basin may be divided into a number of individual settling flow paths in embodiments of a clarifier according to the actual incoming volumetric flow rate of the solids-laden liquid.

As will be described below, specific embodiments of the clarifier, trough, methods for use of the trough, apparatus, and methods for supplying clarified liquid from a clarifier to provide efficiencies that are as planned or expected based on design criteria, may be provided to achieve certain advantages. It will be obvious, however, to one skilled in the art, that the present invention may be practiced without some or all of these specific details. In other instances, well known process operations have not been described in detail in order not to obscure the present invention.

Figure 2:
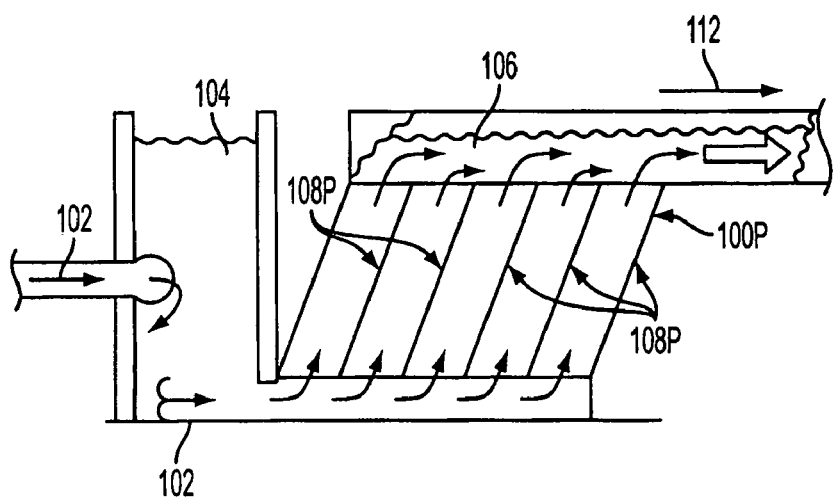
FIG. 2 is a side elevational view showing a flow of incoming solids-laden liquid to a typical prior art clarifier.

FIG. 1 illustrates a graph 100 showing an exemplary range of volumetric flow rate VOLIN of an incoming flow of water or wastewater to a prior art basin in which a clarifier 100P is provided. FIG. 2 is a side elevational view showing a flow (arrow 102) of incoming solids-laden liquid 104 to the clarifier 100P. The range of the volumetric flow rate of the incoming flow to the basin is illustrated in FIG. 1 in units of gallons per minute (GPM) and is shown as a function of time in units of hours during a day. Generally, a so-called turndown ratio may be an exemplary 2.5 to 1. The turndown ratio is illustrated by high values of the volumetric flow rate of the incoming flow (e.g., about 10,000 GPM) that may be during hours near 6 AM, noon, and 6 PM, whereas low values of the volumetric flow rate of the incoming flow (e.g., about 4,000 GPM) may be between those "high" hours. VOLIN may be divided among various clarifiers 101P, for example. However, even after such division, the exemplary 2.5 to 1 turndown ratio may result in a volumetric flow rate of the incoming flow 102 to a particular clarifier 101P varying in a wide range of VOLIN. With the exemplary 5,500 GPM range of VOLIN, the one clarifier 101P must be designed for efficiency in a percentage of this range and within the exemplary maximum of 10,000 GPM. The exemplary clarifier 101P may be in a municipal water system, for example, or in an industrial water system. It may be understood that the embodiments (i.e., of the present invention, see exemplary clarifier 101 below) are configured so that, in response to the incoming flow 102 in the exemplary range of flow rates, the clarifier 101 operates with a desired efficiency to discharge clarified liquid 106 from separate settling flow paths 108.

Figure 3A:
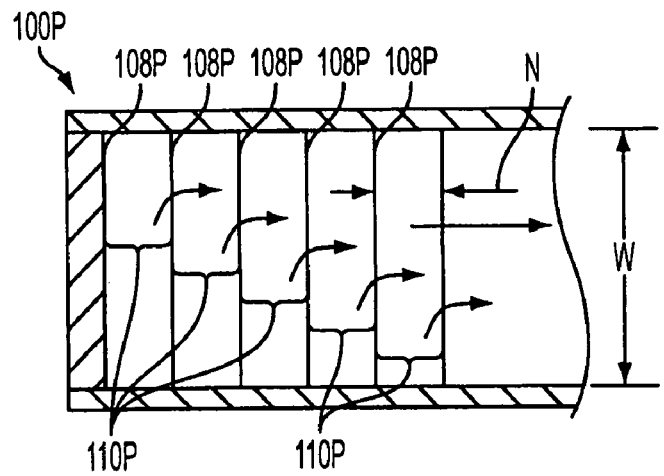
FIGS. 3A and 3B illustrate plan views of typical settling flow paths within different types of prior art clarifiers.
Figure 3B:
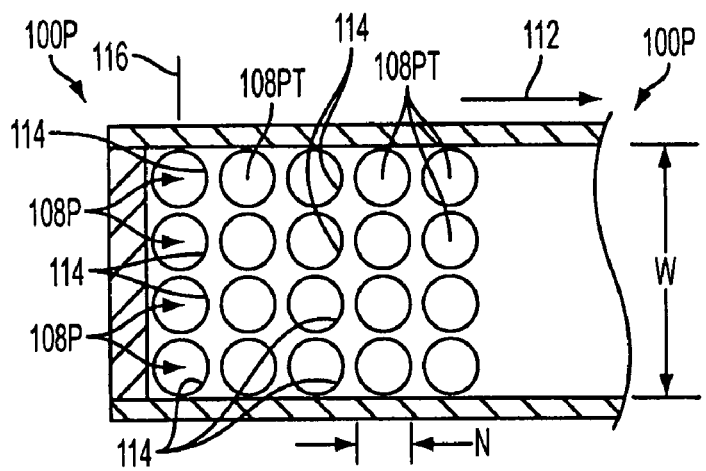

FIGS. 3A and 3B illustrate plan views of typical prior art settling flow paths 108P within the clarifier 100P. FIG. 3A shows the clarifier 100P as a plate settler. The plan view shows that pairs of plates 110P may define each individual path 108P to be 5 feet wide (see W), and with a thickness N that is narrow (e.g., 2.5 inches in a direction 112). Successive individual settling flow paths 108P may be arranged one after each other in the direction 112, such that there is a series of adjacent individual settling flow paths 108P.

In FIG. 3B, the clarifier 100P is shown as a tube settler, and each settling flow path 108P may be defined by a tube 114P, and may have an exemplary circular cross-section having a diameter of two inches. The settling flow path may be identified as 108PT to refer to the tube configuration. These settling flow paths 108PT may be arranged in a row 116 that is 5 feet wide (see W). Each settling flow path 108PT may also have a thickness N that is narrow in the direction 112 (due to the circular, or tubular, configuration having the diameter of two inches). Successive columns 116 of the tubes 114P that define the flow paths 108PT may be arranged one after each other in the direction 112 across which the clarifier 100P extends. Thus, there may be a series of adjacent columns 116 of tubes 114P, and each tube 114P of each row 116 defines a separate one of the flow paths 108PT. As shown in FIG. 2, and applicable to FIGS. 3A and 3B, each flow path 108P extends upwardly at a settling angle with respect to horizontal.

Figure 3C:
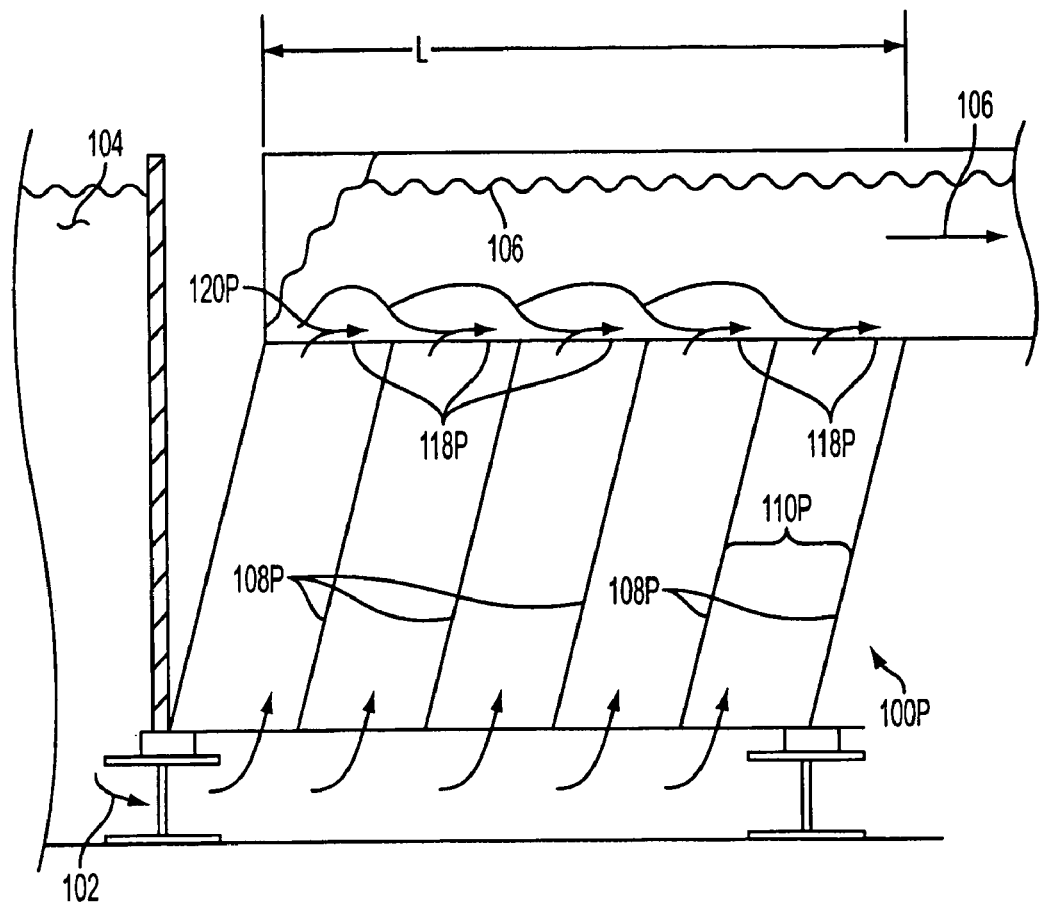
FIG. 3C is an elevational sectional view of a prior art clarifier, applicable to each of the plate and tube settler types of clarifier shown in FIGS. 3A and 3B.

FIG. 3C is an elevational sectional view of the prior art clarifier 100P, and is the same for each of the plate and tube settler configurations. FIG. 3C shows that from a top, or exit, 118P of each settling flow path 108P there is a flow, or discharge, 120P of the clarified liquid 106. An exit 118PT (not shown) is at the top of each tube 114P. An exit 118P is shown at upper end of each of the paths 108P in the illustrated upflow type of clarifier 100P. The exits 118p and 118PT are open to permit the flow 120P to exit the respective settling flow path 108P.

For ease of description, reference is made below only to the FIG. 3A plate configuration of the clarifier 100P, it being understood that in the following description the combined tube exits 118T in one column 116 generally correspond to the exit 118P of a settling flow path 108P that is defined by the plates 110P. As described with respect to both FIGS. 3A and 3B, there are the successive individual settling flow paths 108P, arranged one after each other in the direction 112 across which the clarifier 100P extends for a length L. Proceeding over the exits 118P in the direction 112, there are successive flows 120P of clarified liquid 106. (For the column 116, flows 120P from all tubes 114P in the row 116 are considered as one flow 120P). One such flow 120P is from each of the settling flow paths 108P of FIG. 3A. These flows 120P are described below with respect to FIG. 5 in terms of flows 136 in a trough 137.

Figure 4:
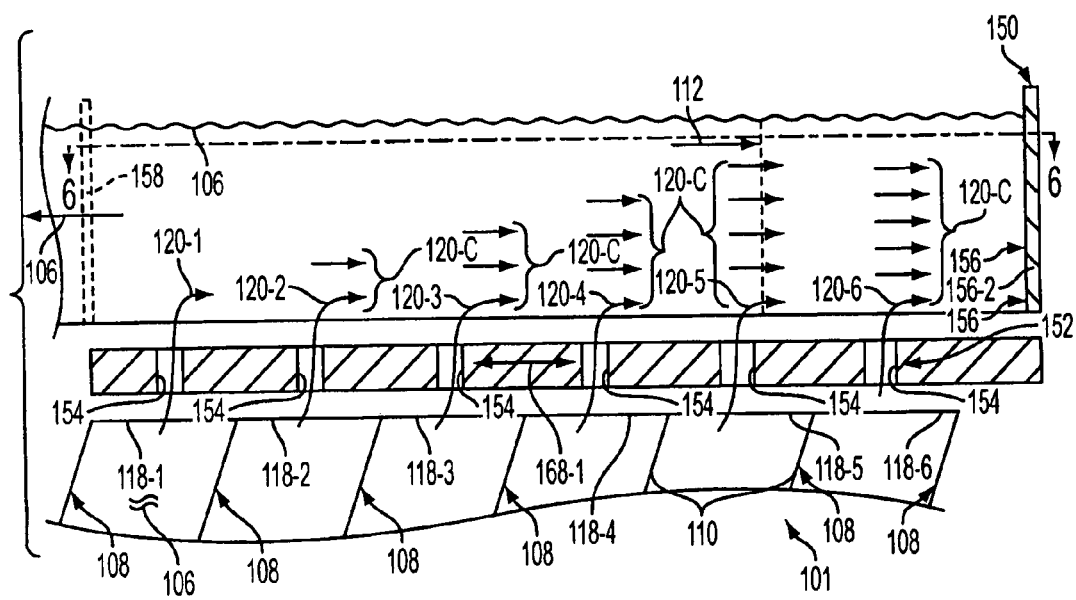
FIG. 4 shows an embodiment of a trough receiving discharges of clarified liquid from one embodiment of the clarifier through exemplary exits.

Referring to FIG. 4, in a general sense many embodiments (i.e., of the present invention) may be provided to define embodiments of a clarifier 101 with exits 118 and 118T, and to define flows, or discharges, 120 of clarified liquid 106. Common to these embodiments, FIG. 4 shows six exemplary exits, i.e., 118-1 through 118-6. Also, one flow 120 is shown from one exit 118 using one arrow 120, and so-called "combined" flow from two successive exemplary exits (e.g., 118-1 and 118-2) using two such arrows 120 (e.g., 120-1 & 120-2). It may thus be understood that FIG. 4 shows that when the successive flows 120 of clarified fluid 106 are guided in the same direction 112, one flow 120 from one settling flow path 108 and one exit 118, combines with another flow 120 from the next adjacent (downstream) settling flow path 108 and exit 118, and so forth from the successive downstream settling flow paths 108 and exits 118 along that direction 112. Thus, one flow 120-1 is at exit 118-1, two flows 120-1 and 120-2 are at exit 118-2, etc. For ease of illustration, in the other Figures the combined flow of two or more of the flows 120 is identified as 120-C and is shown flowing in the direction 112.

Figure 5:
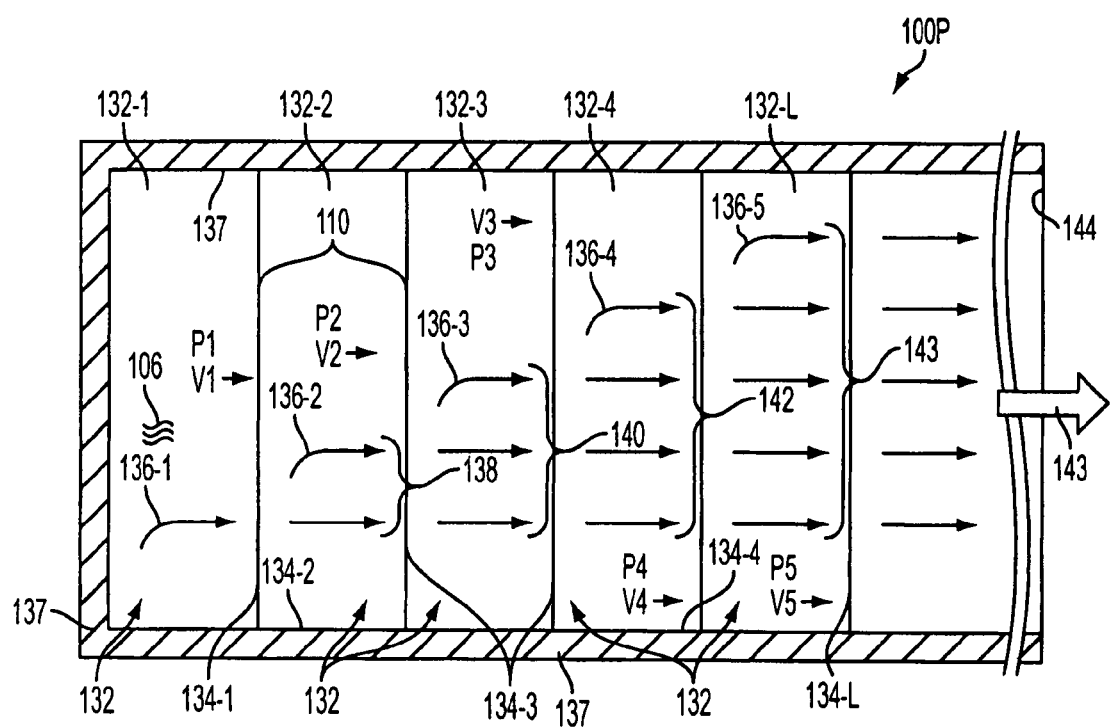
FIG. 5 is a plan view of a prior art clarifier having a series of settling flow paths that discharge liquid through exits, illustrating problems in a trough and in the clarifier when separate discharges of clarified liquid flow from the clarifier and through the trough.

Improvements embodied in the clarifier 101 may be understood by reference to FIG. 5, and by referring again to Applicant's analysis of the drawbacks of prior free flow of clarified liquid in the "common" spaces above tops of individual settling flow paths. FIG. 5 shows a plan view of the prior art clarifier 100P having a series of individual settling flow paths 132 each of which discharges through an exit 134 to initially provide separate discharge flows 136 of clarified liquid 106 from the clarifier 130. Initially separate discharge flows 136-1 and 136-2 from respective paths 132-1 and 132-2 are shown mixing and joining in a trough 137 that is above the clarifier 130. The mixed and joined flows 136 combine to form a combined flow (bracket 138). Flow 138 is shown mixing in the common space (within the trough 137), e.g., flow 138 mixes with a flow 136-3 from path 132-3 to form a combined flow 140. This mixing continues as the flow 140 continues in the direction 112, adds flow 136-4 forming another combined flow 142. At a last settling flow path 132-L the combined flow is identified as 143. Applicant's analysis indicated that this mixing of settling flows occurs "freely" as the flows 138, 140, 142, & 143 flow in the trough 137 to the trough outlet 144. The drawback Applicant observed in the use of such troughs 137 is that as the clarified liquid 106 freely flows in the trough 137 past more and more of the tops of more and more of the settling flow paths 132 on the way to the trough outlet 144, the exemplary trough flows 138, 140, 142, and 143 gain trough flow velocity all along the way to the trough outlet 144. Such Applicant concluded that as a result of this drawback of trough flow velocity gains, there are unequal pressure heads P1, P2, P3, etc. at the tops of the respective settling flow paths 132-1, 132-2, 132-3, etc. As a further conclusion, the pressure heads P vary according to the respective trough flow velocities V1, V2, V3, etc. of the exemplary free trough flows 138, 140, 142, and 143 past the tops of the respective particular settling flow paths 132. As a further conclusion, the resultant unequal pressure heads P were said to relate to the volumetric settling flow rate (e.g., of flow in the settling flow paths 132). Such Applicant concluded that the settling flow paths (e.g., 132-3, 132-4 & 132-L) having tops at which the trough flow velocity VT of the trough flow is high tend to have an increased volumetric settling flow rate, and the increased volumetric settling flow rate of the settling flow is higher than volumetric settling flow rates in settling flow paths having tops at which the trough flow velocity of the trough flow is lower (i.e., in paths 132-1 and 132-2). It was concluded that the settling flow paths 132-3, 132-4, & 132-L with increased volumetric settling flow rate (i.e., the "low efficiency settling paths") have the additional drawback of less settling, i.e., less removal of solids for a given inflow of solids to the settling flow path 132, and thus more solids flowing out of those settling flow paths having the increased volumetric settling flow rate. As noted, the final conclusion was that another drawback is that the increased volumetric settling flow rate in one low efficiency settling path (e.g., 132-3) tends to disturb the volumetric settling flow rates in the other settling flow paths (e.g., 132-1 and 132-2), such that the operating efficiency of the clarifier 130 is reduced. In this discussion above, the increased volumetric settling flow rate is above the exemplary acceptable range of volumetric settling flow rates of from about two to six GPM in each individual settling flow path 132, and the lower volumetric settling flow rate is the exemplary acceptable rate.

In terms of Applicant's analysis and reference to clarifier efficiency, it may be understood that there is an efficiency (referred to as a settler efficiency SE) of a settling flow path in settling the solids (not shown), measured in percent (%) of a standard particle-bearing liquid that flows into the clarifier. High values of the efficiency SE may be expressed as 95% or more, are dependent on maintaining the low, constant volumetric settling flow rate of all of settling flow in all of the individual settling flow paths 132. Thus, an increase in the volumetric settling flow rate (as from the exemplary flow paths 132-2, 132-3, 132-4, & 132-L) renders the corresponding settling flow path less efficient, and there is undesired low efficiency operation of the clarifier 130, e.g., at efficiencies SE below about 80%. For example, preferred volumetric settling flow rates in the settling flow paths 108 for high values of the efficiency SE of settling may be in a range of about 90% to about 95% for volumetric settling flow rates of about four to about eight GPM. The efficiency SE may decrease by about five percent for each two GPM of settling flow rate in excess of this range. These drawbacks may be stated in terms of a problem in which there is an increase in trough flow velocity with increase in distance from the exits 134-1 to exits 134-L, or with increase in distance from a first clarifier exit 118-1 (FIG. 3A) to a last exit 118-L. The drawbacks result in a tendency for a higher volumetric settling flow rate in the downstream settling flow paths 108 closer to path 108-L as compared to the volumetric settling flow rate in the paths 132 closer to path 132-1, and the further conclusion was that there is less settling in the higher volumetric settling flow rate paths 132 closer to path 132-L, resulting in the above-noted overall decrease in the efficiency SE of the clarifier 130.

Figure 6:
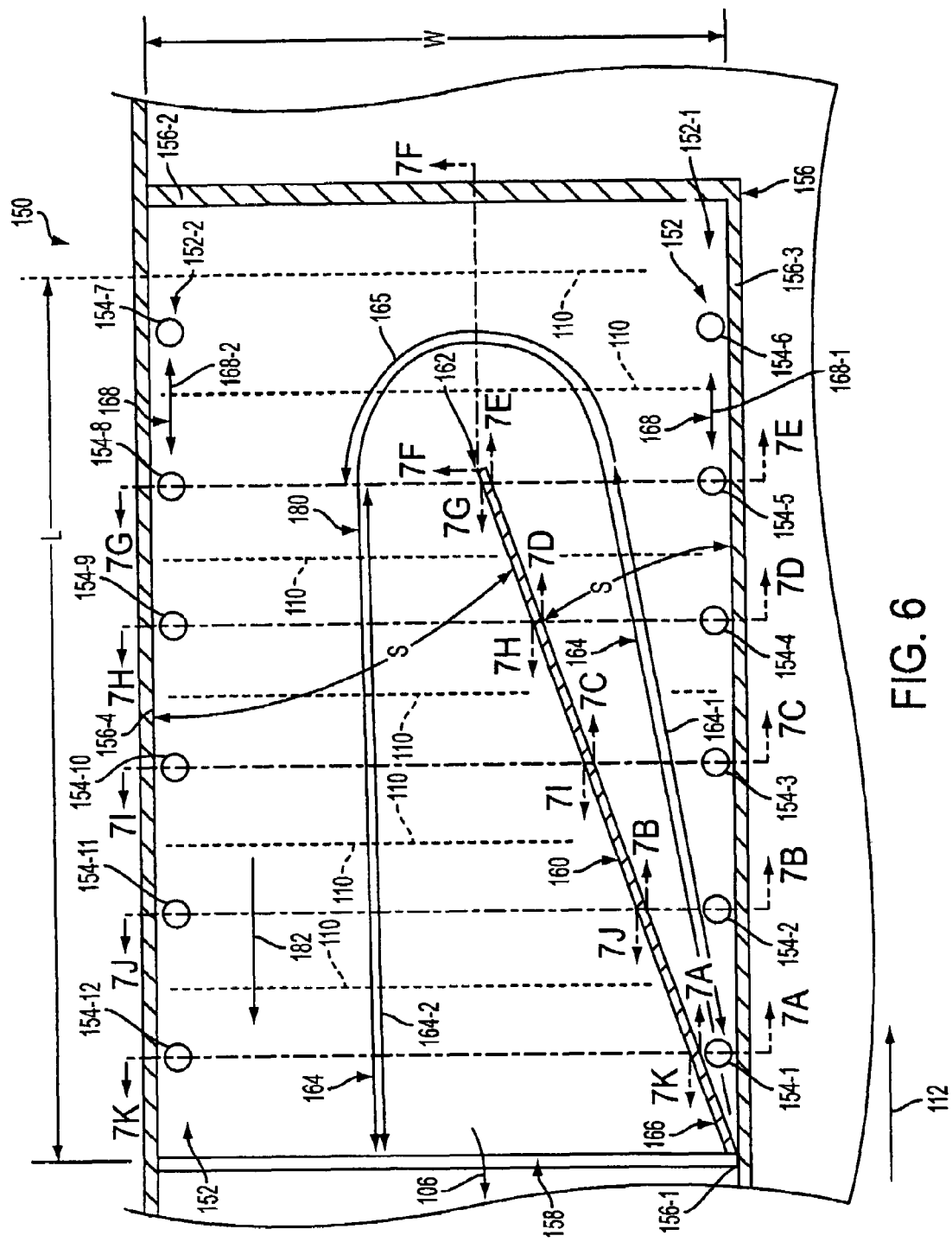
FIG. 6 is a plan view illustrating an embodiment of a trough used with the FIG. 4 embodiment, in which volumetric settling flow rates are the same in settling flow paths due to a constant trough flow velocity in a trough to provide constant pressure heads across the exits of the clarifier settling flow paths.

With the efficiency SE in mind, the embodiments, and how the embodiments over-come these drawbacks, may be understood by reference to FIGS. 4 & 6. As background, as described above with respect to the embodiment shown in FIG. 4, the exemplary exits 118, and the exemplary flows, or discharges, 120 of the clarified liquid 106 from the clarifier 101, have a common characteristic of (1) the "combined" flow from two exemplary successive exits 118 (shown by two arrows 120, e.g., 120-1 and 120-2), and (2) the overall combined flow 120-C. It is to be understood that the embodiment shown in FIG. 4 avoids the above-described drawbacks & problems described with respect to FIG. 5. Thus, in FIG. 4 successive flows 120 of clarified fluid 106 are in the same direction 112, and those flows 120 are not the freely flowing flows 136 of FIG. 5, and are not the free flows 120P of FIG. 3C. In general, although in FIG. 4 the one flow 120 from one settling flow path 108 and one exit 118, combines with another flow 120 from the next adjacent (downstream) settling flow path 108 and exit 118, and so forth from the successive downstream settling flow paths 108 and exits 118 along that direction 112 (and is identified as 120C flowing in the direction 112), the above-described drawbacks & problems described with respect to FIG. 5 are avoided.

Figure 8:
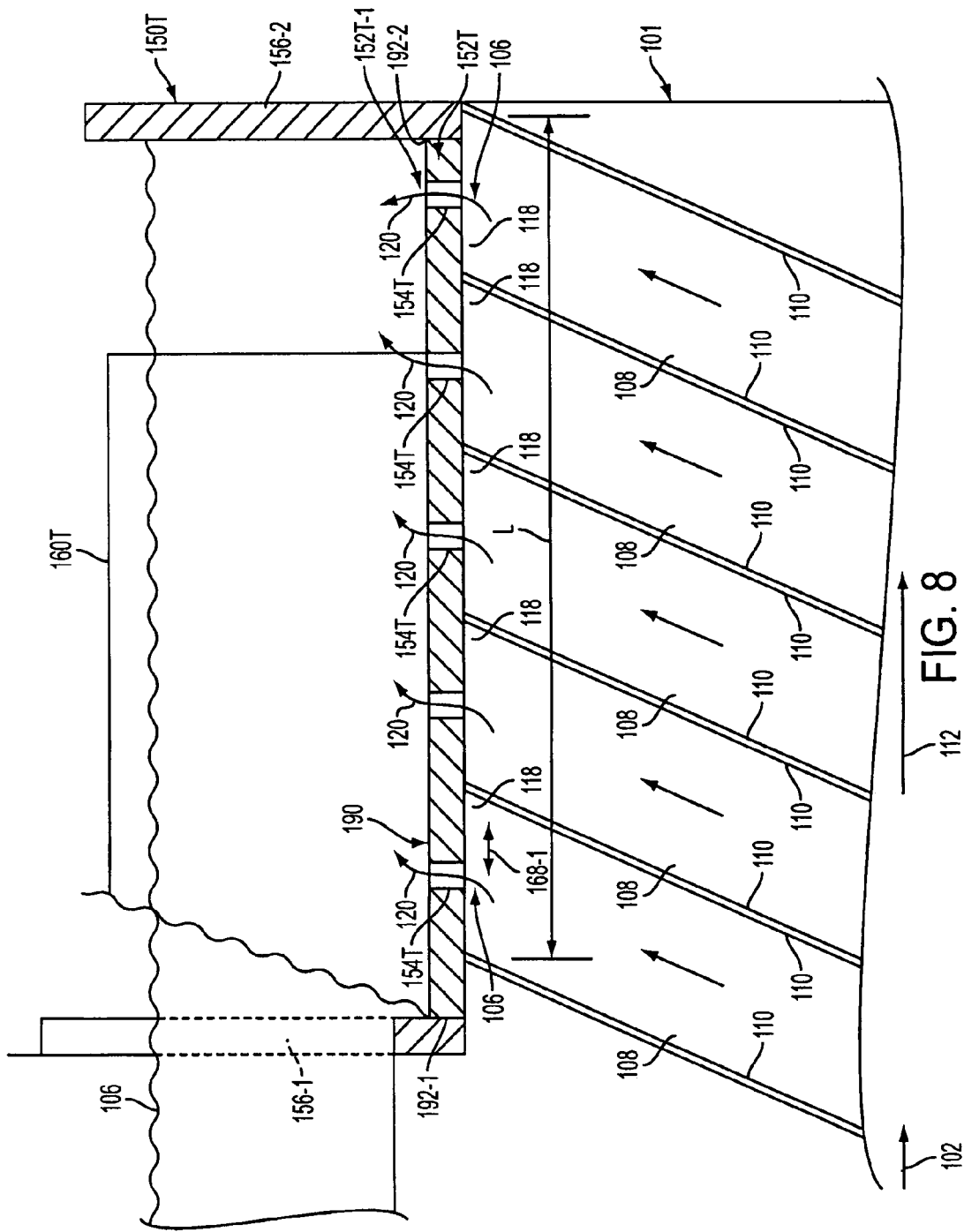
FIG. 8 is a cross sectional view showing one embodiment of arrays of orifices configured between the trough and the clarifier, wherein the arrays are in the trough.
Figure 9:
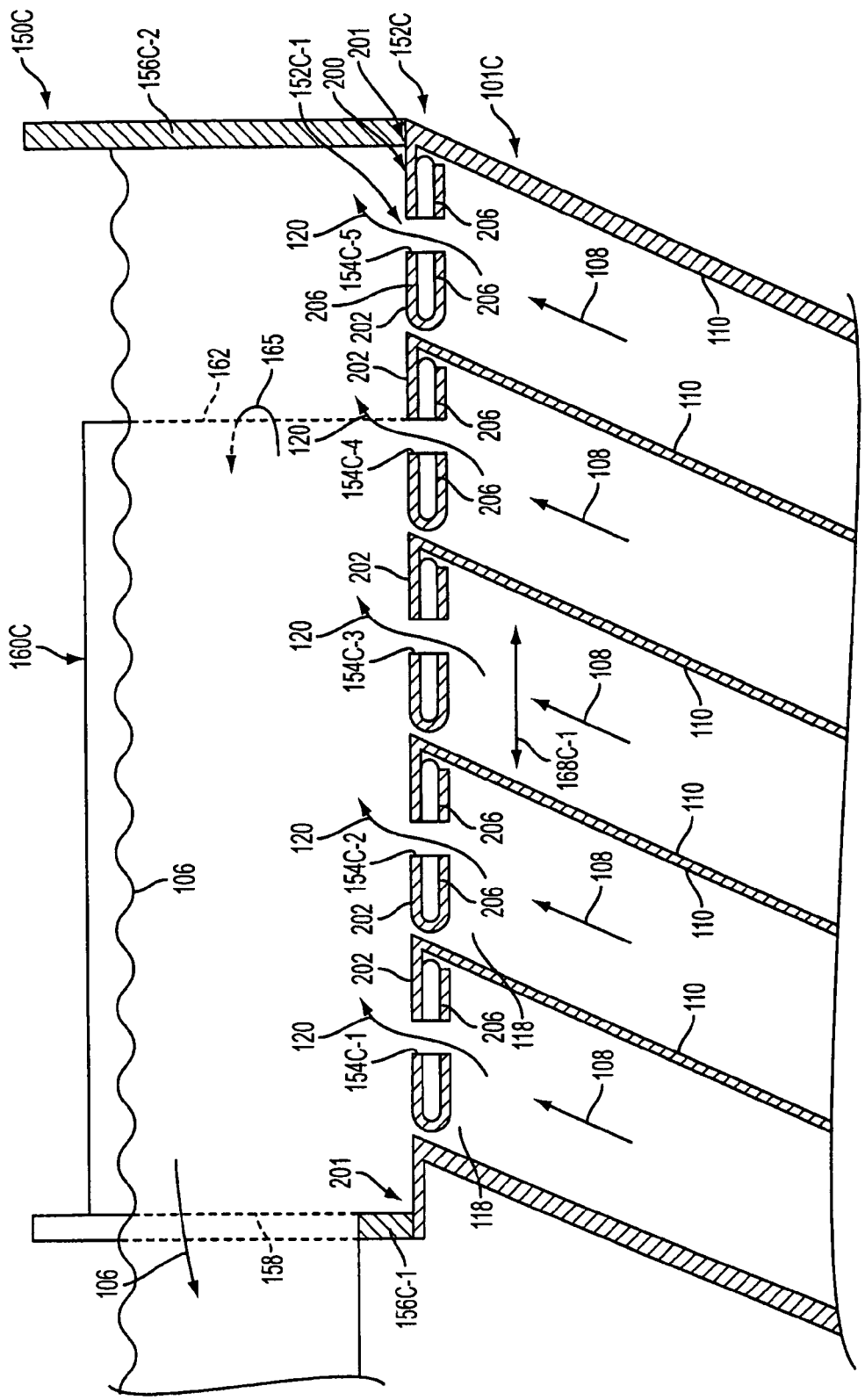
FIG. 9 is a cross sectional view showing one embodiment of the arrays of orifices configured between the trough and the clarifier, wherein the arrays are in the clarifier.

It may be understood, that in a general sense, FIG. 4, with FIG. 6, show embodiments in which (i) the volumetric settling flow rate is the same (as defined above) in each of the settling flow paths 108, and (ii) a trough flow velocity in a trough 150 is constant (as defined above) to provide the constant pressure heads H across the exits 118 of the clarifier 101. The elevational view of FIG. 4 is exploded to show one embodiment in which an array 152 of orifices 154 is generally between the trough 150 and the clarifier 101. For reference, FIG. 8 shows one embodiment of the arrays 152 configured between the trough and the clarifier, wherein the arrays 152 are configured "with" (i.e., in) the trough. Also for reference, FIG. 9 shows one embodiment of the arrays 152 configured between the trough and the clarifier, wherein the arrays are configured "with" (i.e., in) the clarifier. In the embodiments of FIGS. 8 and 9, the trough 150 & the clarifier 101 are joined so that the clarified liquid 106 from each settling flow path 108 flow directly into the trough 150. Also, although the sectional views of FIGS. 7A through 7K are shown in the manner of FIG. 4 with orifices 154 between the trough and the clarifier, each such view of FIGS. 7A through 7K may be as shown in the FIGS. 10 and 11 in which a respective trough or clarifier is "with" the orifices.

FIG. 6 views downwardly through and past the trough 150 in the general embodiment of FIG. 4. FIG. 6 shows a plurality of the arrays 152. Each array 152 is configured extending along the clarifier length L that corresponds to a length in the direction 112 along which the exits 118 of the clarifier extend. FIG. 4 also shows a different one of the orifices 154 vertically aligned with a different one of the settling flow paths 108, which is alignment with the exits 118 from such paths 108. FIG. 6 shows the width W of the clarifier 101 as a width across the settling flow paths 108, and each array 152 is shown spaced across the settling flow path width W. Thus, one array 152-1 is spaced away from all of the other arrays, with one other exemplary array 152-2 being shown in this embodiment, and with the arrays preferably straight. Each orifice 154 is configured to discharge clarified liquid 106. Areas of the orifices 154 of the arrays 152 have the same value. The general embodiment of FIGS. 4 & 6 is shown configured with an exemplary six settling flow paths 108, and with an exemplary six orifices 154 in each array 152 (see 154-1 through 154-12). It is to be understood that the clarifier 101 may be configured with any number of settling flow paths 108 according to a particular condition, e.g., the volumetric flow rate of the incoming flow 102. Also, one orifice 154 of one array 152 may also be provided for each such settling flow path 108.

Still considering the general embodiment, the trough 150 may be as shown in FIG. 4 overlying the length L (FIG. 6) of the clarifier 101, and overlying the settling flow path width W. Thus, the area of the trough 150 between sides 156 of the trough overlaps the area in which the arrays 152 are provided, and overlaps the length L and width W (and thus the plan view area) of the clarifier 101. FIGS. 4 & 6 show the trough 150 configured with the sides 156 to receive and enclose the clarified liquid 106 discharged from the exits 118. By an absence of cross-hatching, FIG. 6 shows that a first side 156-1 is configured with an outlet 158 for the clarified liquid 106. A second side 156-2 is spaced from and opposite to the first side 156-1. Respective third and fourth sides 156-3 and 156-4 extend spaced from each other and between the respective first and second sides 156-1 and 156-2. The sides 156-2 through 156-4 extend upwardly to define a container in which the clarified liquid 106 flows from the orifices 154 to the outlet 158 for flow from the trough 150.

Still considering the general embodiment, an additional aspect of overcoming the drawbacks of the above-described free flow of clarified liquid (i.e., the "trough flow") may be by configuring the trough 150 to avoid the above-described trough flow velocity gains on the way to the trough outlet 158. This aspect relates to at least one septum 160. The plan view of the trough 150 in FIG. 6 shows the at least one septum 160 as one septum that may extend from the first side 156-1 to a termination 162 spaced from the second side 156-2. The exemplary one septum 160 is shown extending at the same angle S with respect to each of the third and fourth sides. Such septum 160 is also configured extending from a corner 166 between the first side 156-1 and the third side 156-3, and extending toward the termination 162. The termination is shown in FIG. 6 also spaced from the third side 156-3 and from the fourth side 156-4. The exemplary one septum 160 is configured to divide the container (defined by the trough 150) into at least one continuous trough flow path (see elongated arrow 164) extending from the first side 156-1 to the termination 162 and around the termination 162 to the liquid outlet 158. The flow path 164 extending "around" may be configured by a U-turn (see shorter arrow 165) in the trough 150. The U-turn 165 may be defined by the termination 162 and the sides 156-2 and 156-3 and 156-4.

When viewed as in FIG. 6 looking down through the trough 150 and onto the arrays 152, in the general embodiment the one septum 160 is shown configuring the one continuous trough flow path 164 to include a first section (arrow 164-1) and a second section (arrow 164-2). The first section 164-1 starts at the first side 156-1 adjacent to the corner 166. As section 164-1 extends to the termination 162 that section extends above only a first one 152-1 of the arrays 152. In this manner, the trough section 164-1 is configured to receive the clarified liquid 106 from the first one of the arrays 152-1, and thus receives the clarified liquid only from a row (see arrow 168-1) of the orifices, or inlets, 154. In the elevational view of FIG. 4, the one row 168-1 of orifices 154 of the array 152-1 is shown extending lower than the third side 156-3, and in FIG. 6 that row 168-1 is shown adjacent to the third side 156-3.

Still considering the general embodiment as viewed in FIG. 4 down through the trough 150 and onto the arrays 152, the second section 164-2 of the continuous trough flow path 164 is shown extending from the U-turn section 165 around the termination 162 (see curve in arrow 164) and back to the first side 156-1 at the liquid outlet 158. The second section 164-2 is also shown extending above only a second one 152-2 of the arrays 152. In this manner, the trough 150 is configured to receive the clarified liquid 106 from the second of the arrays 152-2, and thus from another row (arrow 168-2) of the orifices 154 of the array 152-2. Similar to the elevational view of FIG. 4, the one row of orifices 154 of the array 152-2 extends lower than the fourth side 156-4, and in FIG. 6 that row 168-2 is shown adjacent to the fourth side.

In the general embodiment, the exemplary one septum 160 and the respective second and third and fourth sides 156-2, 156-3, and 156-4 guide the clarified liquid 106 in the trough 150 to the liquid outlet 158. For this guiding, in this embodiment, the trough 150 is configured with the exemplary one septum 160 extending at the angle S so that the exemplary one continuous trough flow path 164 has a liquid flow area A (shown as AA-AK in respective FIGS. 7A-7K) that uniformly-increases from the first side 156-1 to the termination 162 and around and from the termination to the liquid outlet 158 at the first side 156-1. The areas AA-AK are a function of the height HTFP of the clarified liquid in the trough 150 and of a uniformly increasing width WTFP (between the septum 160 and the appropriate one of sides 156-3 or 156-4. It may be understood that as the incoming volumetric flow rate (FIG. 1) varies, height HTFP will vary. However, in the embodiments, for any given volumetric flow rate of the flow 102 of incoming solids and liquid, the HTFP will be constant in the trough 150. Thus, in the various FIGS. 7A through 7K, the height HTFP is shown the same. The uniform increase of the angle S is with respect to increasing trough flow path length 180 (corresponding in FIG. 6 to the entire length of arrow 164) from the first side 156-1 to and around the termination 162 and from the termination to the liquid outlet 158 at the first side. One aspect of this uniform increase of angle S is that with respect to the third side 156-3 and the fourth side 156-4 the angle S is an acute angle having the same value with respect to each of the third and fourth sides.

Figure 7A:
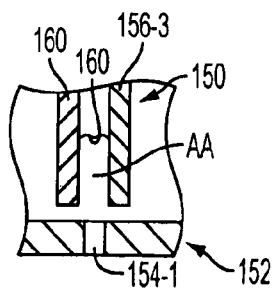
FIGS. 7A-7K are cross sectional views of a flow path through the trough, illustrating a uniform increase of an area of the path between spaced section lines on which those Figures are taken at uniformly-spaced intervals in FIG. 6.
Figure 7B:
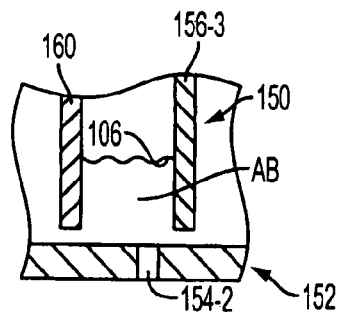
Figure 7C:
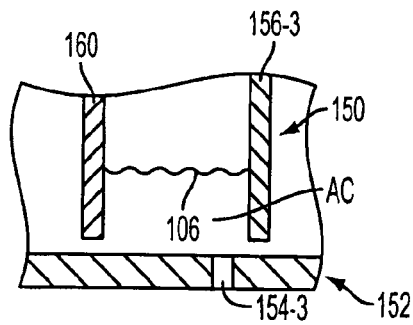

An example of this uniform increase of area A is shown in FIGS. 7A-7K by the spaced section lines on which those Figures are taken at the uniformly-spaced intervals of the orifices 154, and taken once around the U-turn 165. FIG. 7A is taken closest to corner 166. Moving in the direction 112 the sections 7B-7E are toward and to termination 162, then moving ninety degrees around the termination 162 to the section for FIG. 7F, and then ninety more degrees to the section for FIG. 7G that starts a reverse direction 182 (the reverse of direction 112), then moving in reverse direction 182, sections are taken for FIGS. 7G-7K on the way to the outlet 158. It may be understood then that the angle S is configured so that the continuous trough flow path 164 has the liquid flow area A that uniformly-increases with increasing trough flow path length 180 from the first side 156-1 to the termination 162, around the termination 162 along the U-turn 165, and from the termination 162 to the liquid outlet 158 at the first side 156-1. Such uniform increase in the area A is an additional aspect of overcoming the above-described drawbacks, and avoids the above-described trough flow velocity gains on the way to the trough outlet 158. This uniform increase may be understood by successively viewing the increase of area A in FIGS. 7A-7K, where area AA is shown in FIG. 7A, etc.

Still considering the general embodiment, viewing FIG. 6 it may be further understood that the septum 160 is configured with respect to the third side 156-3 to define the first part (or section, see arrowhead line 164-1) of the continuous trough flow path 164 for receiving the clarified liquid 106 from the one array 152-1 and to guide the received liquid 106 between the septum 160 and the third side 156-3. The guiding is toward and to and around the termination 162. Guiding around the trough 150 is via the U-turn 165. The septum 160 is further configured with respect to the fourth side 156-4 to define the second part (or section, see arrowhead line 164-2) of the continuous trough flow path 164. The second part 164-2 is configured to receive the clarified liquid from the other array 152-2 and to guide the received liquid 106 between the septum 160 and the fourth side 156-2 and toward and to the liquid outlet 158. The second part is further configured to receive the liquid 106 flowing around the termination 162 (along the U-turn 165) from the first section 164-1 and to guide that liquid 106 to join the liquid received from the other array 152-2 for combined, or joint, flow between the septum 160 and the fourth side 156-4 toward and to the liquid outlet 158.

For the above-described general embodiment, reference was made to FIGS. 4 & 6 showing one embodiment in which the array 152 of orifices 154 is between the trough 150 and the clarifier 101. FIG. 8 was said to show one embodiment of the arrays 152 between the trough 150 and the clarifier 101, the arrays 152 being with (in) the trough 150. In FIG. 8 the embodiment of the arrays with the arrays with the trough is shown with the trough identified as 150T and the arrays as 152T. In an exemplary embodiment with two rows of the arrays (as in FIG. 6), the arrays are referred to as 152T, one row being referred to as 168T-1 and another as 168T-2, and the orifices of the arrays 152T and rows 168T are identified as 154T. FIG. 8 shows that in this one embodiment of the trough 150T the trough (or container) 150T is further configured with a bottom 190 extending between and secured to each of the sides 156. The bottom 190 is configured with respective edges 192 at respective sides 156. Edges 192-1 & 192-2 are shown in FIG. 8. The plurality of arrays 152T may be configured in the bottom 190, with one row 168-1 of one array 152T-1 extending through the bottom 190 adjacent to a third edge 192-3 and the other row 168-2 of the other array 152-2 extending through the bottom adjacent to a fourth edge 192-4. FIG. 6 shows this configuration of the rows 168-1 & 168-2 with respect to corresponding sides 156-3 and 156-4.

Still considering this embodiment, the trough 150T overlies the length L of the clarifier 101, and may also overlie the settling flow path width W, both as shown in FIG. 6. Thus, the area of the trough 150T between sides 156T overlaps the area in which the arrays 152T are provided in the bottom 190T, and overlaps the length L and width W (and thus the area) of the plan view of the clarifier 101. The trough 150T is configured with the sides 156 to receive and enclose the clarified liquid 106 discharged from the exits 118. FIG. 8 shows the first side 156-1 configured with the outlet 158 for the clarified liquid 106. The sides are as described above with respect to FIGS. 4 and 6. An additional aspect of overcoming the drawbacks of the above-described free flow of clarified liquid (i.e., the "trough flow") may be by configuring the trough 150T to avoid the above-described trough flow velocity gains on the way to the trough outlet 158. This aspect relates to at least one septum 160, which is provided in the trough 150T in the same manner as is provided in trough 150 (as described with respect to FIGS. 4, 6 and 7A-7K).

For the above-described general embodiment, FIGS. 4 & 6 were said to show one embodiment with the array 152 of orifices 154 between the trough 150 and the clarifier 101, and FIG. 9 was said to show the arrays 152 configured between the trough 150 and the clarifier 101, the arrays 152 being with (in) the clarifier 101. For ease of understanding, in FIG. 9 the embodiment with the arrays with the trough is shown with an embodiment of the clarifier identified as 101C, the trough is also identified as 150C. Also, one array is shown as 152C. In an exemplary embodiment with two rows of the arrays as is generally shown in FIG. 6, for the array 152C, one row is referred to as 168C-1 and another as 168C-2, and the orifices of the arrays 152C and rows 168C are identified as 154C (see 154C-1, etc.). FIG. 9 shows that in this one embodiment of the trough 150C the trough (or container) 150C is further configured without a bottom. The trough 150C is overlying (above) the clarifier 101C so that the sides 156 of the trough 150C extend above and vertically align with the length L and width W of the clarifier 101C. The clarifier 101C is provided with a deck 200 extending across the width W and length L of the clarifier, and having a perimeter 201. The deck perimeter 201 may be secured to, or very close to, the sides 156. In this manner, as described in more detail below, substantially all of the flow of clarified liquid 106 is discharged into the trough 150C. "Substantially" means that leakage of liquid 106 between the clarifier 101C and the trough 150C is limited to flow corresponding to flow through one orifice 154.

In one embodiment, the deck 200 is configured at the exits 118 at the upper end of each of the separate settling flow paths 108. Two such exits 118 are identified in FIG. 9. The deck 200 at each of the upper ends is configured with a flow path closure member 202, and the members 202 combine to define a flat horizontal roof over the clarifier 101C. For the discharge of the clarified liquid 106 from each path 108, each flow path closure member 202 may be configured as a fold 206, and each fold 206 may have a number of the orifices 154C of one of the arrays 152C according to the clarifier embodiment with which the deck 200 is used. For example, a clarifier embodiment in the configuration shown in FIG. 6 has two rows 168-2 of the orifices 154C. In the FIG. 9 embodiment, each fold 206 has two orifices 154 (one in row 168C-1 and one in row 168C-2). For the FIG. 6 embodiment of the arrays 152C, FIG. 9 shows one array 152C-1 with one row 168C-1 of orifices 154C (shown as 154C-1, etc.). Each array 152C is spaced across the width W of the members 202 in the manner shown in FIG. 6. It may be understood that one fold 206 is configured with one orifice 154C-1 in the row 168C-1 and the same fold 206 is configured with one orifice 154C-2 in the row 168C-2. The orifices of each of the one array 152C are configured to discharge clarified liquid 106 into the continuous trough flow path 164 in a manner described below.

Still considering this FIG. 9 embodiment, as noted the trough 150C overlies the length L and width W of the clarifier 101C in the same manner as in FIG. 6. Thus, in plan view the area of the trough 150C between sides 156C overlaps the area in which the arrays 152C are provided in the deck 200 (within the deck perimeter 201, overlapping the length L and width W, and thus the area) of the clarifier 101C. FIG. 9 shows the trough 150C configured with the sides 156C to receive and enclose the clarified liquid 106 discharged from the orifices 154C. The first side 156C-1 is configured with the outlet 158 for the clarified liquid 106. The sides 156 are as described with respect to FIG. 6. An additional aspect of overcoming the drawbacks of the above-described free flow of clarified liquid (i.e., avoiding the "free trough flow", FIG. 5) is again by configuring the trough 150C to avoid the above-described trough flow velocity gains on the way to the trough outlet 158. In this regard, the exemplary one septum 160C is used in the same manner as provided in the troughs 150 and 150T (as described with respect to FIGS. 6, 7A-7K, & 8).

Figure 10:
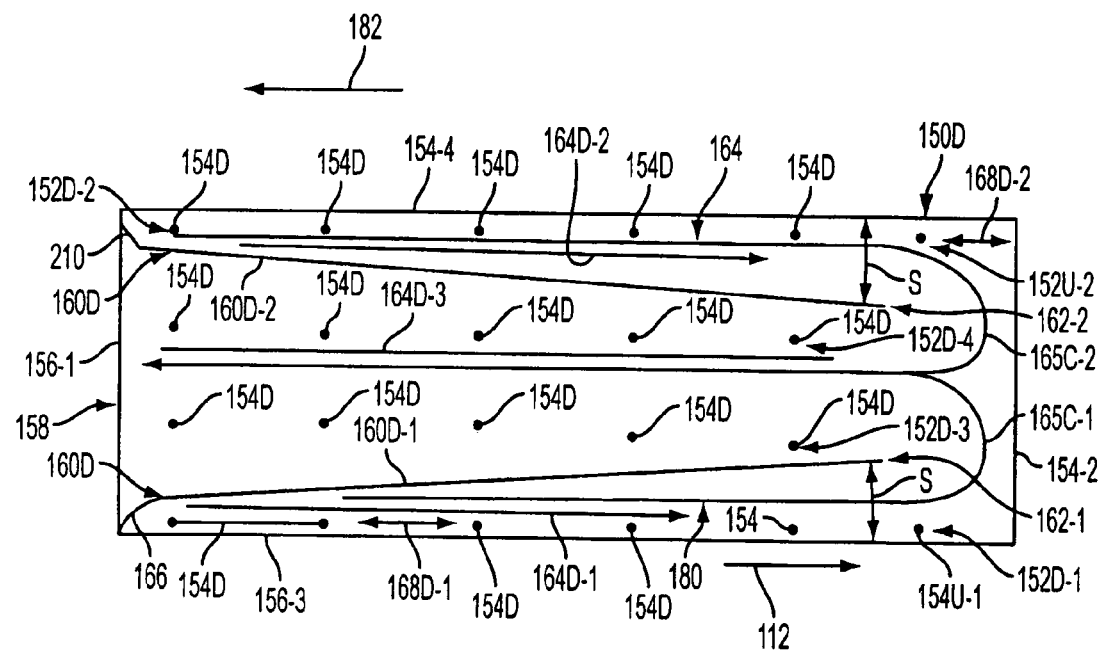
FIG. 10 is a schematic plan view showing one embodiment of the trough in which one septum is two septa.

FIG. 10 is a schematic plan view showing one embodiment of the trough 150 in which the at least one septum is two septa, and the continuous trough flow path (arrow 164) is at least one continuous trough flow path. In this embodiment, the at least one continuous trough flow path 164 is configured in two parallel sections that merge into and are continuous with one central trough flow path section. An aspect of overcoming the drawbacks of the above-described free flow of clarified liquid (i.e., avoiding the "free trough flow", FIG. 5), and an aspect related to configuring the trough 150 to avoid the above-described trough flow velocity gains on the way to the trough outlet 158, also relate to the two septa. The two septa are generally identified as 160D, where "D" refers to "dual" (or two). One septum is specifically identified as 160D-1 and the other specifically as 160D-2, and the trough specifically as 150D. In one embodiment, the trough 150D may, e.g., have the bottom 190 in the manner of trough 150T and be used with the clarifier 101T. In another embodiment, the trough 150D may, e.g., have no bottom in the manner of trough 150C and be used with the clarifier 101C that is configured with the deck 200. FIG. 10 schematically shows that in each case the first septum 160D-1 extends from the corner 166 (between the first side 156-1 and the third side 156-3). Septum 160D-1 extends toward and to a first termination 162-1 at the angle S having a first value S1 with respect to the third side 156-3. The second septum 160D-2 extends from a second corner 210 (between the first side 156-1 and the fourth side 156-4). Septum 160D-2 extends toward and to a second termination 162-2 at the angle S (having the same value S1) with respect to the fourth side 156-4.

FIG. 10 shows that the continuous trough flow path 164 may be configured in two parallel sections (arrow 164D-1 and arrow 164D-2). Via a respective U-turn 165C-1 and 165C-2 each respective parallel section 164C-1 and 164C-2 is continuous with the third section 164D-3. The first septum 160D-1 is configured to define the first section, which in the embodiment of the trough 150D is identified by arrow 164D-1. For this, the first septum 160D-1 cooperates with the third side 156-3. The second septum 160D-2 is configured to define the second section of the continuous trough flow path 164, identified by arrow 164D-2. For this, the second septum 160D-2 cooperates with the fourth side 156-4. Sections 164D-1 and 164D-2 extend in a parallel manner in the first direction 112.

As noted, via a respective U-turn 165C-1 and 165C-2 (that combine to define an M-turn 220) each respective parallel section 164C-1 and 164C-2 is continuous with the third section 164D-3. Further, each of the first septum 164D-1 and second septum 164D-2 cooperates with the other to define the third section 164D-3. Thus, the third section 164D-3 is between the two septa 160D-1 and 160D-2. The third section 164D-3 extends from a respective termination 162D-1 or 162D-2 of a respective septum 160D-1 or 160D-2 to the liquid outlet 158 at the first side 156-1. The third section 164D-3 continues the respective first and second sections 164D-1 and 164D-2 of the continuous trough flow path 164D to the fluid outlet 158. This continuation occurs during joining of the sections 164D-1 and 164D-2 at the "M-turn" 220.

It is recalled that in the general embodiment of FIG. 6, the orifices 154 of one row 168 of arrays 152 were shown vertically aligned with different ones of the settling flow paths 108. Also, each of the sections 164-1 and 164-2 of the continuous trough flow path 164 was shown extending above only one of the plurality of arrays 152 of orifices 154. FIG. 10 shows that the trough 150D is configured corresponding to such general embodiment. In detail, FIG. 10 schematically shows the plurality of arrays 152 as four arrays 152D-1 through 152D-4, and these arrays may be configured as in embodiment 150T or 101C. For general descriptive purposes, the schematic plan view of FIG. 10 is similar to FIG. 6 and shows the FIG. 10 embodiment with arrays 152D. For ease of illustration, the arrays 152D are schematically shown with the orifices 154D as "dots" (rather than circles), it being understood that the orifices 154 may be circular as shown in FIG. 6, e.g. The array 152D is configured with each of the orifices 154D having the same area. A first of the arrays 152D-1 extends lower than and adjacent to the third side 156-3 of the trough 150D to discharge the clarified liquid 106 up into the first section 164D-1. The second of the arrays 152D-2 extends lower than and adjacent to the fourth side 156-4 to discharge clarified liquid 106 up into the second section 164D-2. A third array 152D-3 and a fourth array 152D-4 each extend lower than and below the third section 164D-3 to discharge clarified liquid up into the third section 164D-3. In each case, the discharging is from one settling flow path 108 into and through a respective aligned orifice 154D of a row 168D and into the respective section 164D of the continuous trough flow path 164.

Still referring to the embodiment of FIG. 10, the angle S is shown and is configured with a first value (e.g., S1) that is the same for both the first section 164D-1 and second section 164D-2. In this manner, the at least one continuous trough flow path 164 comprises two continuous trough flow path branches (each consisting of one of the parallel path sections 164D-1 and 164D-2), with the branches merging continuously into the third section 164D-3. Alternatively, the two septa 160 may be described as forming two of the continuous trough flow paths 164D. One comprises the respective first and third sections 164D-1 and 164D-3. A second of the continuous trough flow paths 164D comprises the respective second and third sections 164D-2 and 164D-3.

In each case of the continuous branches or two continuous trough flow paths, consistent with the above description of the general embodiment with respect to FIGS. 7A-& 7K, each of the first and second sections 164D-1 and 164D-2 is configured with the liquid flow area A that uniformly-increases with increasing trough flow path length from the first side 156-1 to the respective termination 162D-1 or 162D-2. This length is a portion of the entire length 180 of the path 164. An increment of this length corresponds to each of the orifices 154D in one row 168D of one array 152D, and as noted, one row 168D-1 supplies clarified liquid 106 to one section 164D-1 and another row 168D-2 supplies clarified liquid 106 to the other section 164D-2. In a combination that occurs when the clarified liquid 106 from each section 164D-1 and 164D-2 join, the joining is thus of a trough flow of liquid 106 from the two rows 168D-1 and 168D-2, the joining being at the M-turn 220. Consistent with FIGS. 7E, 7F, & 7G, each U-turn 165C-1 and 165C-2 receives an added flow from a respective successive orifice 154U-1 and 154U-2 that is adjacent to the side 156-2, such that the trough flow area A continues to increase in each U-turn, and thus increases in the M-turn 220. Because two sections 164D-1 and 164D-2 join, and because each section has received clarified liquid 106 from one row of orifices 154, it may be understood that when these two sections join at the M-turn, two added arrays 152-3 and 152-4 are configured to supply a total incremental additional clarified liquid 106 to the third section 164D-3 that equals the sum of the individual incremental additions of the clarified liquid 106 discharged into sections 164D-1 and 164D-2. This incremental liquid is discharged into the third section 164D-3 while the area A of the third section 164D-3 continues to increase in proportion to increased length of the continuous trough flow path 164C. Because the third section 164C-3 is configured by and between the septum 160C-1 and 160C-2, and because those two septa are at the angle S with respect to the respective sides 156-3 and 156-4, in the reverse direction 182 of the liquid flow in the section 164C-3, the two septa 160C-1 and 160C-2 flare (or extend) away from each other so that the liquid flow area A of section 160C-3 continues to uniformly-increase with increasing trough flow path length from the respective terminations 162C-1 and 162C-2 between the first and second septa to the liquid outlet 158 at the first side 156-1. The flaring away is shown as each septum 160D-1 and 160D-2 flaring at the angle A with respect to the reverse direction 182 to a respective corner 166 or 210.

Figure 11:
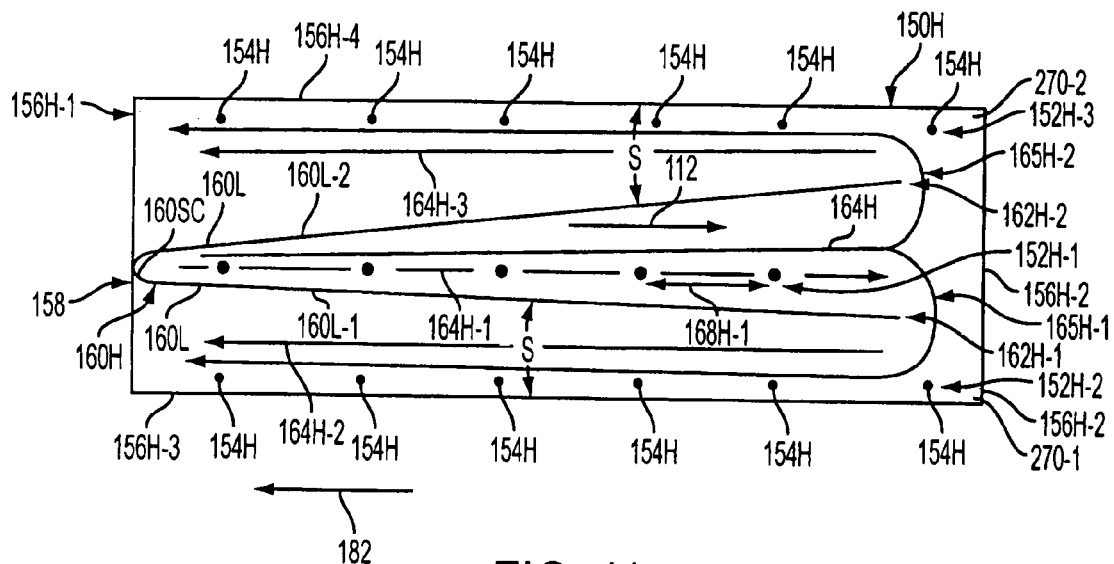
FIG. 11 is a schematic plan view showing another embodiment of the trough in which the septum is one septum, and a continuous trough flow path is at least one continuous trough flow path.

FIG. 11 is a schematic plan view showing another embodiment of the trough 150 (identified as 150H) in which the at least one septum is one septum, and the continuous trough flow path 164 is at least one continuous trough flow path. In this embodiment, the at least one continuous trough flow path 164 is configured with a first central flow path section that splits into two outer trough flow path sections. Thus, the central flow path section is continuous with both of the outer trough flow path sections. An aspect of overcoming the drawbacks of the above-described free flow of clarified liquid (i.e., avoiding the "free trough flow", FIG. 5), and an aspect related to configuring the trough 150 to avoid the above-described trough flow velocity gains on the way to the trough outlet 158, also relate to the one septum.

Referring to FIG. 11, the at least one septum 160 is one septum 160H configured with a hairpin-shape comprising two legs 160L and a sharp curve 160SC between the legs 160L. Each leg 160L is shown having a termination 1602H, termination 162H-1 being adjacent to the sides 156-2 and 156-4, and termination 162H-2 being adjacent to the sides 156-2 and 156-3. The terminations 162H-1 and 162H-2 define part of respective U-turns 165-1 and 165-2. A first of the legs 160L-1 extends from adjacent to a first corner 270-1 between the second side 156-2 and the third side 156-3 and extends toward the first side 156-1 at the angle S. The angle S has a first value S1 with respect to the third side. A second of the legs 160L-2 extends from adjacent to a second corner 270-2 between the second side 156-2 and the fourth side 156-4 and extends toward the first side 156-1 at the angle S. The angle S has the first value S1 with respect to the fourth side 156-4.

The one septum 160H is configured with the legs 160L and sharp curve 160SC to define a first (or central) section 164H-1 of the continuous trough flow path 164. The section 164H-1 extends from the first side 156-1 to the terminations 162H and between the legs 160L, and flow of liquid 106 is in the direction 112. The septum 160H is configured to define respective second and third sections 164H-2 and 164H-3 of the continuous trough flow path 164H. These second and third sections 164H-2 and 164H-3 straddle the first section 164H-1 and extend from the terminations 162H to the first side 156-1. The second section 164H-2 extends along the third side 156-3, and the third section 164H-3 extends along the fourth side 156-4. Between each first and second section, and between each second and third section, there is one of the U-turns (see arrows 165H-1 and 165H-2). Each U-turn 165 is configured between the respective termination 162H and side 156-2 and either side 156-3 or side 156-4.

It is again recalled that in the general embodiment (FIGS. 4 & 6), each orifice 154 of one row 168 of arrays 152 was shown vertically aligned with a different one of the settling flow paths 108. Also, each of the sections 164-1 and 164-2 of the continuous trough flow path 164 was shown extending above only one of the plurality of arrays 152 of orifices 154. The trough 150H is configured corresponding to such general embodiment. For ease of illustration the orifices 154H in FIG. 11 are shown as dots (e.g., instead of circles), it being understood that each dot represents a circle. The plan view of FIG. 11 shows the plurality of arrays 152 as three arrays 152H-1 through 152H-3, and these arrays may be configured as in trough embodiment 150T or in clarifier embodiment 101C. The arrays 152H are configured with certain of the orifices 154H having different areas as described below. In FIG. 11, the plurality of arrays 152H (three arrays) includes the first array 152H-1 extending lower than and centrally between the third side 156H-3 and the fourth side 156H-4 to discharge clarified liquid 106 up into the first section 164H-1 of the continuous trough flow path 164H. The first array 152H-1 is also shown in plan view centered between the legs 160L-1 and 160L-2, and extending in the first direction 112. A second array 152H-2 of the arrays 152H extends lower than and adjacent to the third side 156H-3 to discharge clarified liquid 106 up into the second section 164H-2. In section 164H-2 the liquid 106 flows in the opposite (or reverse) direction 182 (as indicated by the arrowhead of arrow 164H-2). A third array 152H-3 of the arrays 152H extends lower than and below the third section 164H-3 to discharge clarified liquid 106 up into the third section 164H-3. In section 164H-3 the liquid 106 flows in the opposite (or reverse) direction 182 (as indicated by the arrowhead of arrow 164H-3).

Each of the second and third arrays 152H-2 and 152H-3 is configured with orifices 154H having a same first area (referred to as Oa1) having a first value Oa1-1. The first array 152H-1 is configured with orifices 154H having a same second area (referred to as Oa2), the same second area Oa2 having a value Oa2-2 twice the first value. In this regard, it may be recalled that with respect to FIG. 10, because two sections 164D-1 and 164D-2 join, and because each section has received clarified liquid 106 from one row of orifices 154D, when these two sections join at the M-turn 220, two added arrays 152D-3 and 152D-4 were shown configured to supply additional clarified liquid 106 to the third section 164D-3 while the area A of the third trough flow section 164D-3 continued to increase in proportion to increased values of length 180 of the continuous trough flow path 164C. As an alternate to such configuration of FIG. 10, FIG. 11 shows the one central array 152H-1 with one central row 168H-1 of central orifices 154H. The configuration of the central orifices 154H-1 with a value Oa2-2 twice the value Oa2-2 may thus be used instead of a second row of orifices between the legs 160L of the hairpin-shaped septum 160H. This use of the value Oa2-2 of orifices in row 168H-1 provides twice the discharge (GPM) into flow section 164H-1, in anticipation of the splitting of that section 164H-1 at the U-turns 165H-1 and 165H-2 leading to each of the respective second and third sections 164H-2 and 164H-3. The flow areas A of the U-turns 165H-1 and 165H-2 are configured to have the same incremental values as the U-turns extend along the length 180 of the trough flow path 164, and in particular advance around the respective termination 162-1 or 612-2 with an increasing area flow area A that is directly proportional to increasing length 180 around the turn.

Figure 7D:
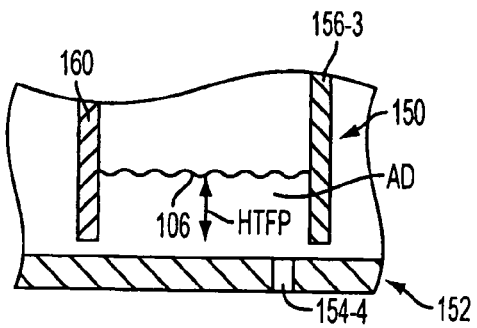
Figure 7E:
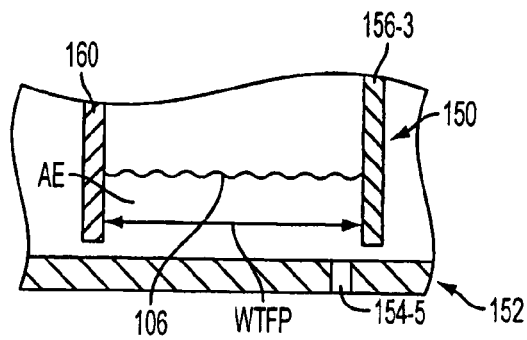
Figure 7F:
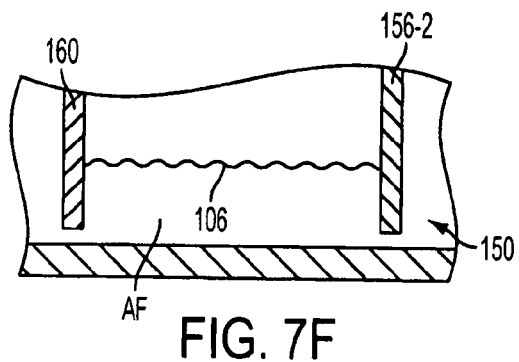
Figure 7G:
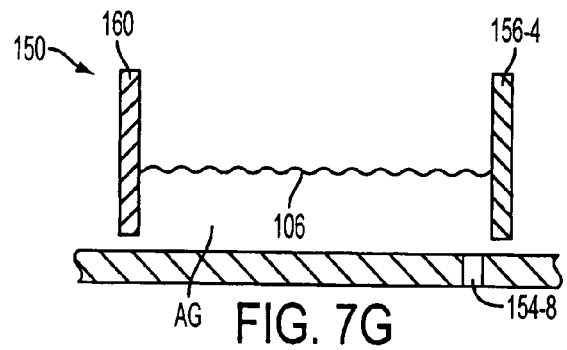
Figure 7H:
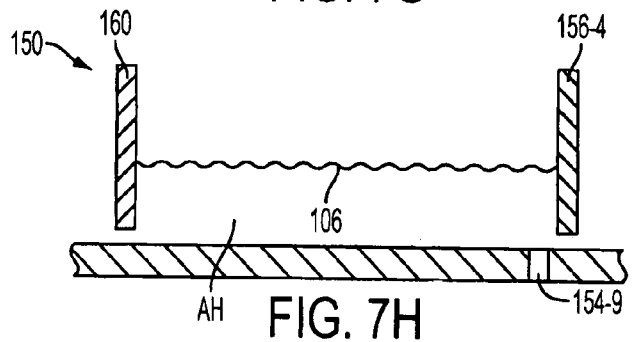
Figure 7I:
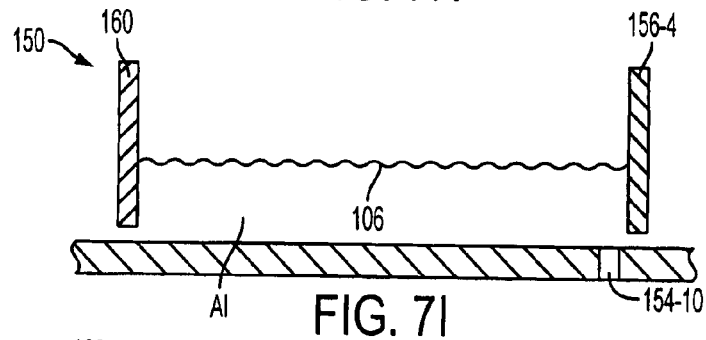
Figure 7J:
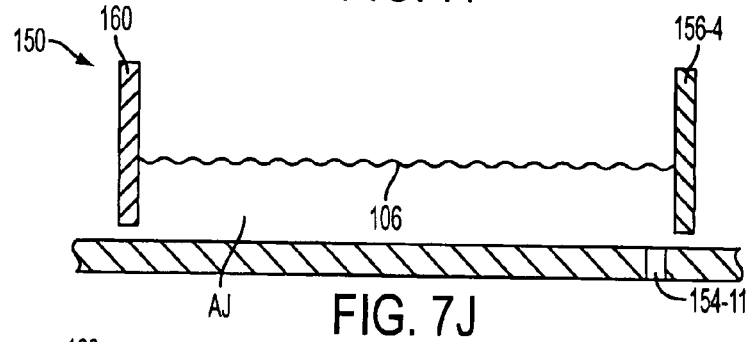
Figure 7K:
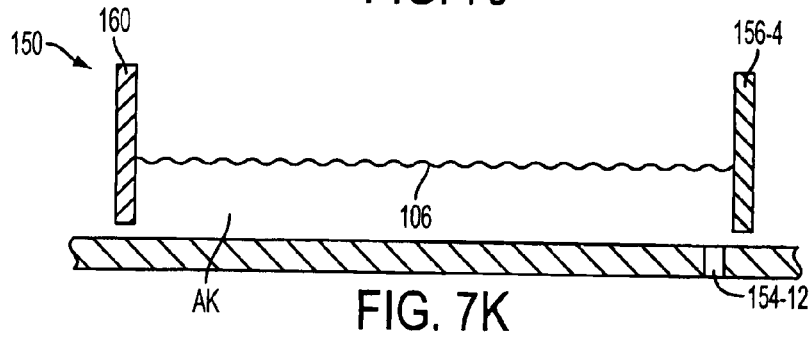

It is to be understood that the description of the trough flow area A of the general embodiment (FIGS. 4, 6, & 7A through 7K) applies to each of the embodiments described above with respect to FIGS. 8, 9, 10, & 11. That description was that the trough flow area A is configured with the exemplary one continuous trough flow path 164, and path 164 has the trough flow area A (shown as AA through AK in respective FIGS. 7A-7K) that uniformly-increases from the first side 156-1 to the termination 162 and around the U-turn 165 (from the termination) to the liquid outlet 158 at the first side 156-1. It is to be understood that regardless of whether the trough flow path 164 is configured from one straight septum 160 (as in the FIG. 6 embodiment), or is configured from one straight septum 160T (as in the FIG. 8 embodiment), or is configured from one straight septum 160H (as in the FIG. 9 embodiment), or is configured from two septa 160D (as in the FIG. 10 embodiment), or is configured from one sharply curved hairpin septum 160H (as in the FIG. 11 embodiment), the uniform increase of the angle S is with respect to increasing trough flow path length 180 from the first side 156-1 to and around the U-turn 165 at the termination and from the termination to the liquid outlet 158 at the first side 156-1. In each such embodiment, the same aspect of this uniform increase of angle S is that with respect to the third side 156-3 and the fourth side 156-4 the angle S is an acute angle having the same value with respect to each of the third and fourth sides. Such uniform increase in the area A is an additional aspect of overcoming the above-described drawbacks, and avoids the trough flow velocity gains on the way to the trough outlet 158, the trough flow velocity being constant as defined above. For each of the continuous trough flow paths 164 of these exemplary embodiments of FIGS. 6, 8, 9, 10, & 11, this uniform increase may be understood by successively viewing the increase of area A in FIGS. 7A-7K, where area AA is shown in FIG. 7A, etc. In review, referring to exemplary FIG. 7D, area A is defined by the height HTFP of the liquid 106 in the trough flow path 164 and by the width WTFP of the trough flow path 164 between (i) the side of the trough 150 (e.g., side 156-2 or 156-3 or 156-4) and (ii) the septum 160 (see e.g., FIG. 7E), or between the two septa 160D-1 and 160D-2 (FIG. 10), or between the two legs 160L-1 and 160L-2 or between each such leg and one of the sides 156-3 or 156-4 (FIG. 11).

It is recalled that the volumetric flow rate of the incoming flow 102 has been described as varying in an exemplary wide range. It is to be understood that the height HTFP may rise to accommodate such varying volumetric flow rate of incoming liquid and solids 102. The benefit of the uniform increase in area A is unaffected by such variations of incoming volumetric flow rates, as follows. Despite variations in incoming volumetric flow rate, for each value of the incoming volumetric flow rate the trough flow velocity remains constant because the height HTFP varies accordingly. Thus, the incoming volumetric flow rate may vary, and for a given incoming volumetric flow rate the volumetric settling flow rate in each of the separate settling flow paths 108 will remain the same (as defined above) because of the uniform increase in area A, even though the absolute value of the volumetric settling flow rate in each of the settling flow paths 108 will be higher when the incoming volumetric flow rate is higher.

Figure 12:
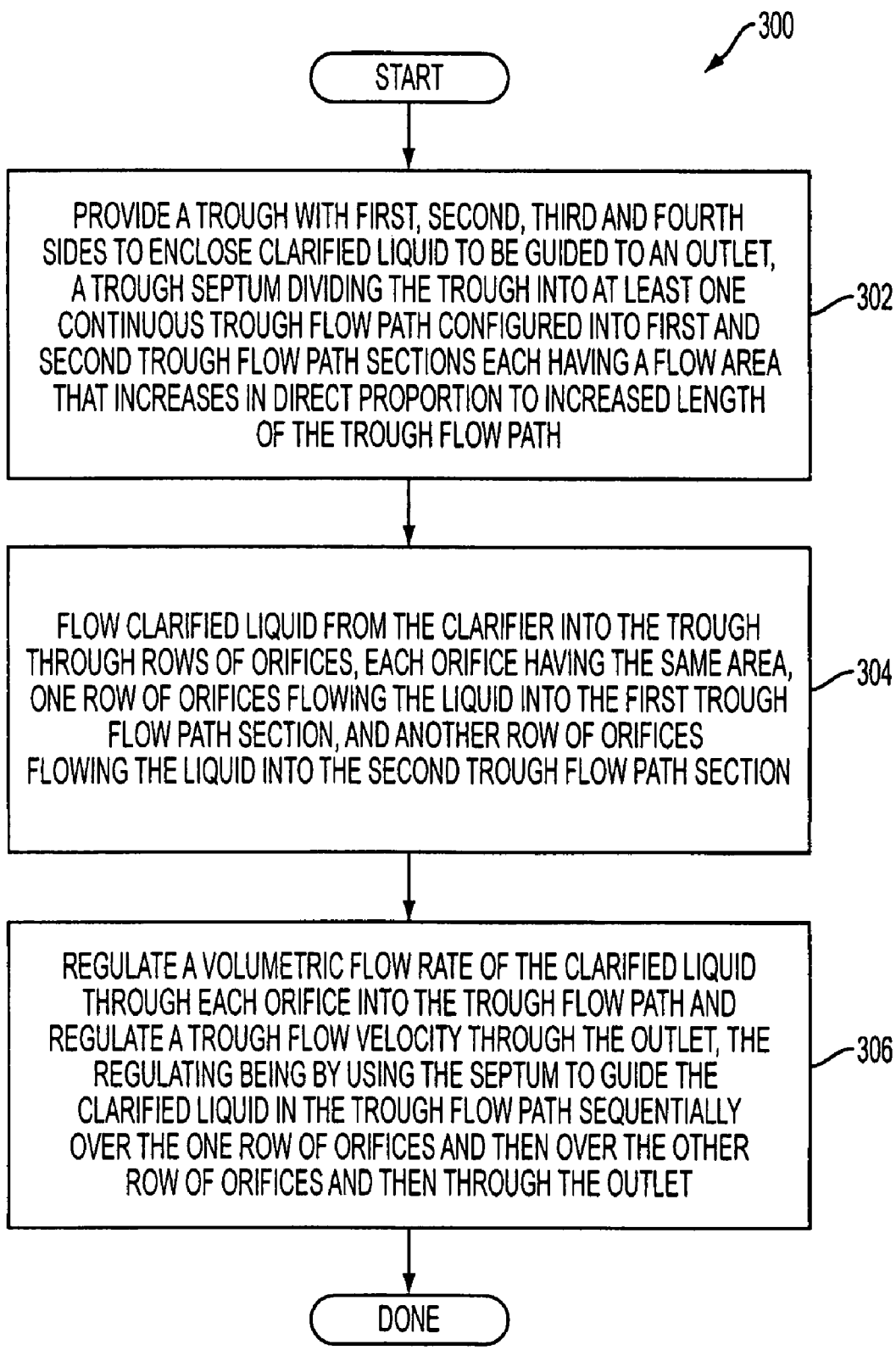
FIG. 12 illustrates a flow chart showing operations of a method for using a trough to improve an efficiency of a clarifier.

In another embodiment, FIG. 12 illustrates a flow chart 300 showing operations of a method of use of a trough to supply clarified liquid from a clarifier. The method may move from start to an operation 302 of providing the trough with first, second, third and fourth sides to enclose clarified liquid to be guided to an outlet, a septum dividing the trough into at least one continuous trough flow path configured into first and second trough flow path sections each having a flow area that increases in direct proportion to increased length of the flow path. The trough may be any of the troughs 150, 150T, 150C, 150D, or 150H, for example. The sides may be the first, second, third and fourth sides 156-1 through 156-4, for example, to enclose the liquid 106 to be guided. The first side 156-1 is configured with a liquid outlet, such as the outlet 158. The septum may be any of the septa 160, 160T, 160C, 160D, or 160H described above. The septum extends at an angle with respect to the third and fourth sides, such as at angle S relative to sides 156-3 and 156-4. The septum divides the trough into at least one continuous trough flow path, such as path 164. A first section 164-1 of the path 164 starts at the first side 156-1 and extends to the termination, such as the termination 162. A U-turn section (e.g., 165) extends around the termination 162. A second section 164-2 extends from the U-turn section 165 and back to the liquid outlet 158. Each of the sections 164-1 and 164-2 has the flow area A that increases in direct proportion to increased length 180 of the flow path 164.

In the use of the trough, the method moves to an operation 304 of flowing clarified liquid from the clarifier into the trough through rows of orifices, each orifice having the same area, one row of orifices flowing the liquid into the first trough flow path section, and another row of orifices flowing the liquid into the second trough flow path section. The flowing may be of clarified liquid 106 from the clarifier 101 into the trough 150 through the rows 168 of orifices 154, each orifice 154 having the same area A. One row 168-1 of orifices 154 may flow the liquid 106 into the first trough flow path section 164-1, and another row 168-2 of orifices 154 may flow the liquid 106 into the second trough flow path section, e.g., 164-2.

In the use of the trough, the method moves to another operation 306 of regulating a volumetric flow rate of the clarified liquid through each orifice into the trough flow path, the regulating also regulating a trough flow velocity all along the trough flow path and through the outlet using the septum to guide the clarified liquid in the trough flow path sequentially over the one row of orifices and then over the other row of orifices and then through the outlet. The regulating of the volumetric flow rate may be of the clarified liquid 106 through each orifice 154 into the trough flow path 164, and the regulating also being of the trough flow velocity all along the trough flow path 164 and through the liquid outlet 158 by using the septum 160. The septum 160 may guide the clarified liquid 106 in the trough flow path 164 sequentially over the one row 168-1 of orifices 154 then over the other row 168-2 of orifices 154 and then through the liquid outlet 158. Because of the angle S of the septum, as the regulating guides the clarified liquid 106 in the trough flow path 168-2 along the septum 160, the flow area A increases along the length 180 of the trough flow path 164 in proportion to increasing distance from the first side 156-1. The increases of the flow area A may be in direct proportion to the increasing distance to provide the pressure head H in the trough 150 at each orifice 154. For a particular height HTFP of liquid 106 in the trough 150, the pressure head H is the same at each orifice 154 so that the regulated flow is at the same volumetric flow rate through each orifice 154 and at the constant trough flow velocity all along the flow path 164 into the outlet 158 to improve the efficiency of the clarifier 101, and the method is done.

Figure 13:
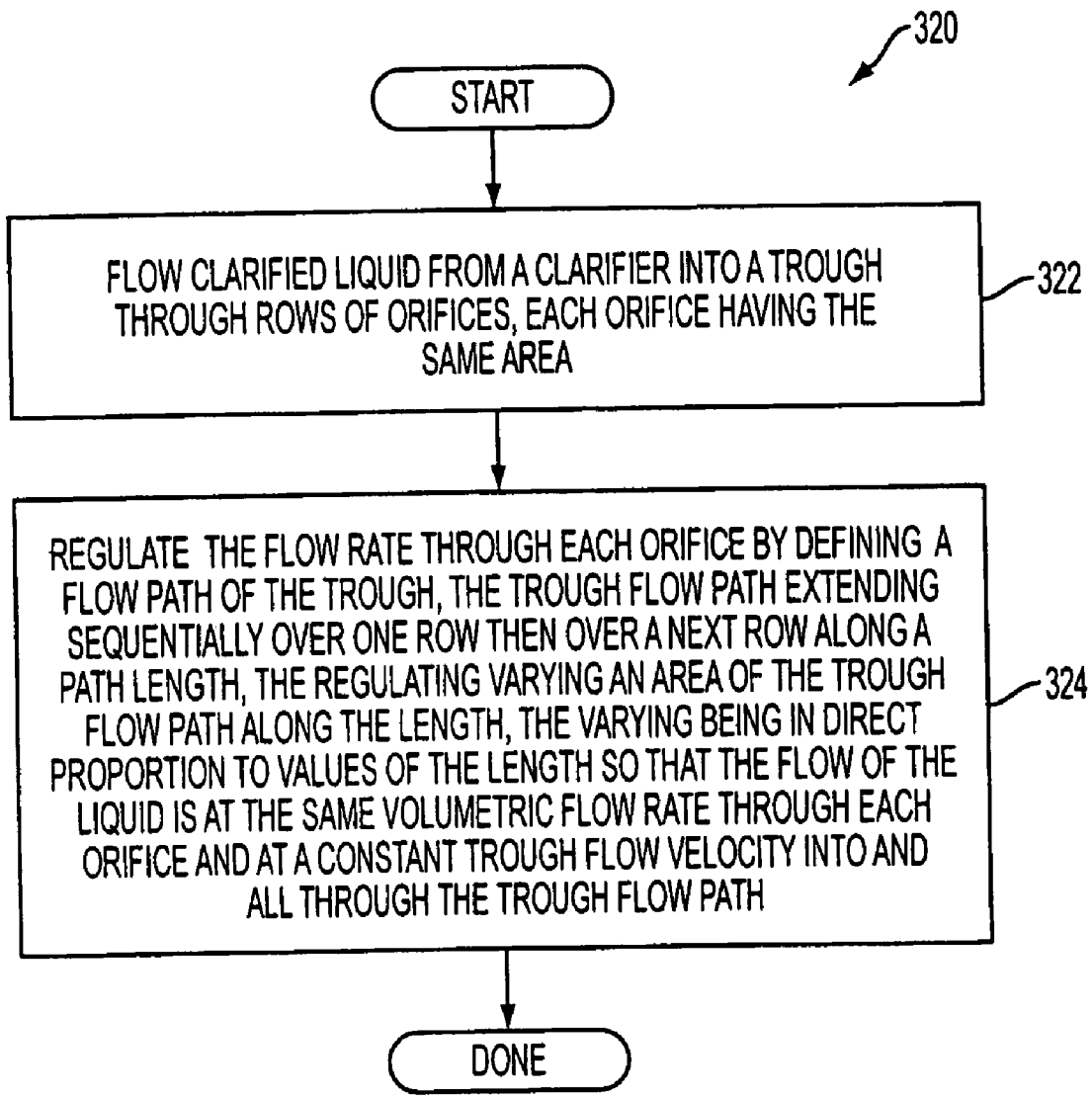
FIG. 13 illustrates a flow chart showing operations of a method for supplying clarified liquid from a clarifier.

In a still further embodiment, FIG. 13 illustrates a flow chart 320 showing operations of a method for supplying clarified liquid from a clarifier. The clarifier may be any of the above-described embodiments of the clarifier 101. The method moves from start to an operation 322 of flowing the clarified liquid from the clarifier into a trough through rows of orifices. The trough may be one of the troughs 150, 150T, 150C, 150D, or 150H, for example. The rows may be rows 168 of the orifices 154. Each orifice may have the same area, one orifice of each row defining one adjacent outlet. For example, the rows 168 may define adjacent clarifier outlets, and one orifice 154 of each row 168 may define an adjacent outlet.

The method moves to an operation 324 of regulating the flow rate through each orifice by defining a flow path of the trough. The flow path may be path 164. The defined trough flow path extends sequentially over one row then over a next row along a path length. The one row may be row 168D-1 and the next row may be 168D-2 (FIG. 10). The defined trough flow path has the path length from a first end to an exit end and may be configured with a trough flow area. The length may be length 180 from first end (or side) 156-1 and past a termination 162 and a U-turn 165 to an exit at the same first end (or side) 156-1. The trough flow area may be area A composed of a height HTFP of the liquid 106, and a flow width WTFP. The regulating operation 324 varies the trough flow area A along the length 180, the varying being in direct proportion to a value of the length to provide a pressure head in the trough at each orifice. The trough flow area A may be varied in direct proportion to values of the length along the length 180. That variation provides a pressure head H in the trough 150 at each orifice 154. For a particular height HA of the liquid 106 in the trough flow path 164, the pressure head H is the same at each orifice 154 so that the volumetric flow rate of the liquid 106 is the same through each orifice 154 and the trough flow velocity all along the flow path 164 is constant to improve the efficiency of the clarifier 101.

The flowing operation 322 may orient the rows 152 parallel to each other. The regulating operation 324 may include defining the first trough flow path section 164-1 over only the one row 168-1 generally in the first direction 112. Operation 324 may also define the second trough flow path section 164-2 separate from the first trough flow path section 164-1 and only over the next row 168-2 and in the second direction 182 opposite to the first direction. Operation 324 may also define the trough flow path U-turn 165 between the first and second sections.

Also, in the flowing operation 322 the rows 152 of orifices 154 may be spaced from each other. In operation 322 the flow is received from the one of the rows of orifices 154 in the first trough flow path section 164-1. The first trough flow path section 164-1 may extending in the first direction 112 over the one row 152-1 of orifices. The operation 324 may further include expanding the flow area A of the first flow path section 164-1 to maintain the flow rate of the liquid 106 constant in the first trough flow path section 164-1 as the liquid 106 flows into the first flow path section from successive ones of the orifices 154 of the first row 168-1. The expanding of the flow area A may be in direct proportion to values of the length 180 along the first trough flow path section 164-1. Operation 324 may also include directing the liquid 106 from the first trough flow path section 164-1 into the second trough flow path section 164-2 that is in the second direction 182.

In another embodiment, the flowing operation 322 may further include receiving the flow from the next row of orifices 152-2 into the second trough flow path section 164-2 that extends over the next row of orifices 152-2. The directing operation 324 may also cause the liquid 106 from the first trough flow path section 164-1 and the received flow from the next row 168-2 of orifices 154-2 to flow in the opposite direction 182 alongside the first trough flow path section 164-1 to expand the flow area A of the second trough flow path section 164-2 and maintain the flow rate of the liquid 106 constant in the second trough flow path section 164-2 while the liquid flows into the second trough flow path section 164-2 from successive ones of the orifices 154 of the next row 168-2 and from the first flow path section 164-1.

In another embodiment, the flowing operation 324 may provide four of the rows 168 of orifices. The regulating operation 324 may also define the flow path 164 extending in two separate sections 164D-1 and 164D-2. Each separate section may extend in the same direction 112 and over a different one of the rows 168. The regulating operation 324 may further define the flow path 164 extending in a third section 164D-3 to simultaneously receive the liquid from the two separate sections 164D-1 and 164D-2 and reverse a direction of flow of the flowing liquid to flow in the direction 182 opposite to the same direction 112 so that the combined liquid flow from the two separate sections is in the third section 164D-3 and the third section extends over third and fourth ones of the rows 168-3 and 168-4 to provide a pressure head P in the trough 150D at each orifice 154D. For a particular height HTFP of liquid 106 in the trough the pressure head P may be the same at each orifice 154.

It is to be understood that the number of orifices 154 in an array 152 may vary according to the desired number of individual settling flow paths 108, for example. It is also to be understood that the general embodiment (FIGS. 6A & 6B), and these embodiments of FIGS. 8, 9, 10, & 11, and the method embodiments described with respect to FIGS. 12 & 13, conform to Applicant's above-described analysis. Thus, these embodiments provide clarifier efficiencies SE that are desirably as planned or expected based on design criteria, e.g., high, as defined above. Those efficiencies are provided by assuring that a constant, or uniform, trough flow velocity of clarifier liquid 106 exists in all flows 120 in the trough flow path 164 above the exits 118 (and related orifices 154). For ease of manufacture, many of these embodiments use orifices 154 having the same area Oa and are preferred, and one only has two areas Oa (FIG. 11). The constant flow rate is provided in each embodiment in relation to the uniform increase of the angle S with respect to increasing trough flow path length 180 from the first side 156-1 to and around the U-turn 165 at the termination 162 and from the termination to the liquid outlet 158 at the first side 156-1. This constant trough flow velocity provided in each embodiment in relation to the uniform increase of the angle S with respect to increasing trough flow path length 180, is in relation to the embodiments of the septa 160 oriented at the angle S as defined above, to provide the constant trough flow velocity that promotes having the same pressure head P above each of those orifices 154.

The same pressure head in turn fosters having the same (as defined above) volumetric flow rate in each of the settling flow paths 108 as the volumetric flow rate through each of the other settling flow paths 108. As a result of the configurations of these embodiments, and of the operations of the methods, there is no settling flow path 108 with an increased volumetric flow rate (i.e., no low efficiency settling path), and with no increased volumetric flow rate in one low efficiency settling path, there is no disturbance of the volumetric flow rates in the other settling flow paths, such that the operating efficiency SE of the clarifier 101 is maintained desirably as planned or expected based on design criteria, e.g., high, as defined above.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A trough for guiding clarified liquid, the trough comprising:

a container configured with sides to enclose the liquid to be guided, a first side being configured with a liquid outlet, a second side being spaced from and opposite to the first side, and third and fourth sides extending spaced from each other and extending between the first and second sides;

at least one septum extending from the first side to a termination spaced from the second side, the at least one septum extending at an angle with respect to the third and fourth sides, the at least one septum being configured to divide the container into at least one trough flow path starting at the first side and extending to the termination, the at least one trough flow path further extending around the termination and back to the first side;

wherein the angle is further configured so that the at least one trough flow path has a liquid flow area that uniformly increases from the first side to the termination and around the termination and from the termination to the liquid outlet at the first side, and wherein the sides have upper and lower portions and inlet for the liquid is provided towards said lower portions.

2. A trough as recited in claim 1, wherein:

the at least one septum is two septa;

a first septum extends from a first corner that is between the first side and the third side and extends toward and to the termination at the angle having a first value with respect to the third side; and a second septum extends from a second corner that is between the first side and the fourth side and extends toward and to the termination at the angle having the first value with respect to the fourth side.

3. A trough as recited in claim 2, where:

the trough is configured to receive the liquid from four rows of inlets, a first row extending lower than and adjacent to the third side, a second row extending lower than and adjacent to the fourth side, and a third row and a fourth row each extending between the two septa;

the first septum is configured with respect to the third side to receive the liquid from the first row of inlets and to guide the received liquid between the first septum and the third side toward the termination and around the termination and between the first and second septa; and the second septum is configured with respect to the fourth side to receive the liquid from the fourth row of inlets and to guide the last-mentioned received liquid between the second septum and the fourth side and toward the termination and around the termination and between the first and second septa; and the first and second septa are further configured to guide the received liquid between the first and second septa and through the liquid outlet.

4. Apparatus for guiding clarified liquid, the apparatus comprising:

a clarifier for settling solids from liquid in a plurality of separate settling flow paths, each of the paths being configured with a flow path width, the paths defining a length of the clarifier;

a plurality of arrays of orifices positioned at a top portion of the clarifier, each array being configured extending along the clarifier length with a different one of the orifices aligned with a different one of the settling flow paths, each array being spaced across the flow path width from all of the other arrays, each orifice being configured to discharge clarified liquid to be guided from the apparatus;

a trough overlying the clarifier length and the flow path width of the settling flow paths and configured with sides to receive and enclose the clarified liquid to be guided, a first side being configured with a liquid outlet, a second side being spaced from and opposite to the first side, and third and fourth sides extending spaced from each other and extend between the first and second sides; and at least one septum extending from the first side to a termination spaced from the second side, the at least one septum extending at an angle with respect to the third and fourth sides, the at least one septum being configured to divide the container into at least one continuous trough flow path extending from the first side to the termination and around the termination to the liquid outlet.

5. Apparatus as recited in claim 4, wherein:

the angle is further configured so that the at least one continuous trough flow path has a liquid flow area that uniformly increases with increasing trough flow path length from the first side to the termination and around the termination and from the termination to the liquid outlet at the first side; and each of the arrays is configured with orifices having the same area.

6. Apparatus as recited in claim 4, wherein:

the at least one septum is one septum;

the one septum extends from a corner between the first side and the third side and extends toward and to the termination; and the termination is also spaced from the third side and from the fourth side.

7. Apparatus as recited in claim 6, wherein:

the plurality of arrays are two arrays;

one array extends lower than and adjacent to the third side; and the other array extends lower than and adjacent to the fourth side.

8. Apparatus as recited in claim 7, wherein:

the clarifier is further configured with an upper end of each of the separate settling flow paths, each of the upper ends being configured with a flow path closure member;

each array being defined in and spaced across the members, and each member being configured with a different one of the orifices of the same array, the orifices of a first array being configured to discharge clarified liquid into the continuous trough flow path between the one septum and the third side, and the orifices of a second array being configured to discharge clarified liquid into the continuous trough flow path between the one septum and the fourth side.

9. Apparatus as recited in claim 4, wherein:

the at least one septum is one septum; and the at least one continuous trough flow path is one continuous trough flow path.

10. Apparatus as recited in claim 9, wherein:

the one septum is configured to divide the container into the one continuous trough flow path comprising a first section, a U-turn section, and a second section; the first section starting at the first side and extending to the termination and extending above only a first one of the arrays; the U-turn section extending from the first section and around the termination to the second section; the second section extending from the U-turn section and back to the first side at the liquid outlet, the U-turn second section also extending above only a second one of the arrays.

11. Apparatus as recited in claim 9, wherein:

the septum is configured with respect to the third side to define a first part of the continuous trough flow path for receiving the liquid from a first of the arrays and to guide the received liquid between the septum and the third side, the guiding being toward and to and around the termination; and the septum is further configured with respect to the fourth side to define a second part of the continuous trough flow path, the second part being configured to receive the liquid from a second of the arrays and to guide the received liquid between the septum and the fourth side and toward and to the liquid outlet, the second part being further configured to receive the liquid flowing around the termination and to guide the last-mentioned liquid to join the liquid received from the second array for flow between the septum and the fourth side toward and to the liquid outlet.

12. Apparatus as recited in claim 9, wherein the angle is further configured so that the one continuous trough flow path has a liquid flow area that uniformly-increases with increasing trough flow path length from the first side to and around the termination and from the termination to the liquid outlet at the first side.

13. Apparatus as recited in claim 12, wherein the angle with respect to the third and fourth sides is an acute angle having the same value with respect to each of the third and fourth sides.

14. Apparatus as recited in claim 4, wherein:
the trough is further configured with a bottom extending between and secured to each of the sides, the bottom having a first edge at the first side, the bottom having a second edge at the second side, the bottom having a third edge at the third side, the bottom having a fourth edge at the fourth side; and
the plurality of arrays is configured in the bottom, the one array extending through the bottom adjacent to the third edge and the other array extending through the bottom adjacent to the fourth edge.

15. Apparatus as recited in claim 4, wherein:
the at least one septum is two septa;
a first septum of the two septa extends from a first corner between the first side and the third side toward a first termination at the angle, the angle having a first value with respect to the third side, the first septum being configured to define a first section of the continuous trough flow path; and
a second septum of the two septa extends from a second corner between the first side and the fourth side toward a second the termination at the angle, the angle having the first value with respect to the fourth side, the second septum being configured to define a second section of the continuous trough flow path;
each of the first septum and the second septum cooperate to define a third section of the continuous trough flow path between the two septa, the third section extending from a respective termination of each respective septum to the fluid outlet at the first side to continue the first and second sections of the continuous trough flow path to the fluid outlet.

16. Apparatus as recited in claim 15, wherein:
the plurality of arrays are four arrays;
each of the arrays is configured with orifices having the same area;
a first of the arrays extends lower than and adjacent to the third side to discharge clarified liquid into the first section;
a second of the arrays extends lower than and adjacent to the fourth side to discharge clarified liquid into the second section; and
a third and a fourth of the arrays each extends lower than and below the third section to discharge clarified liquid into the third section.

17. Apparatus as recited in claim 16, wherein:
the angle having the first value is configured for the first section so that the at least one continuous trough flow path comprises is two continuous trough flow branches;
a first of the continuous trough flow branches comprises the first section,
a second of the continuous trough flow branches comprises the second section;
each of the first and second sections is configured with a trough flow area that uniformly increases with increasing trough flow path length from the first side to the respective termination;
the first and second continuing trough flow branches merge continuously into the third section; and
the third section is configured with a liquid flow area that uniformly-increases with increasing trough flow path length from the respective terminations and between the first and second septa to the liquid outlet at the first side.

18. Apparatus as recited in claim 4, wherein:
the at least one septum is one septum configured with a hairpin-shape comprising two legs and a sharp curve between the legs, each leg having one of the terminations;
a first of the legs extends from adjacent to a first corner between the second side and the third side and extends toward the first side at the angle, the angle having a first value with respect to the third side;
a second of the legs extends from adjacent to a second corner between the second side and the fourth side and extends toward the first side at the angle, the angle having the first value with respect to the fourth side;
the septum is configured to define a third section of the continuous trough flow path extending from the first side to the terminations and extending between the legs;
the septum is configured to define first and second sections of the continuous trough flow path, each of the first and second sections straddling the third section and extending around a respective termination and from the respective termination to the first side, the first section extending along the third side, the third section extending along the fourth side;
the plurality of arrays are three arrays;
a first of the arrays extends lower than and adjacent to the third side to discharge clarified liquid into the first section;
a second of the arrays extends lower than and adjacent to the fourth side to discharge clarified liquid into the second section;
a third of the arrays extends lower than and below the first section to discharge clarified liquid into the third section;
each of the first and second arrays is configured with orifices having a same first area having a first value; and
the third array is configured with orifices having a same second area, the same second area having a value twice the first value.

19. A method for using a trough to supply clarified liquid from a clarifier, the method comprising the operations of:
providing the trough with first, second, third and fourth sides to enclose the liquid to be guided, the first side being configured with a liquid outlet, the trough having a septum dividing the trough into at least one continuous trough flow path configured into a first section and a second section, each section having a flow area that increases in direct proportion to increased length of the flow path;
flowing clarified liquid from the clarifier into the trough through rows of orifices, each orifice having the same area, one row of orifices flowing liquid into the first trough flow path section, another row of orifices flowing liquid into the second trough flow path section; and
regulating a volumetric flow rate of the clarified liquid through each orifice into the trough flow path, the regulating including regulating a trough flow velocity through the liquid outlet using the septum to guide the clarified liquid in the at least one trough flow path sequentially over the one row of orifices then over the other row of orifices and then through the liquid outlet.

20. A method as recited in claim 19, wherein:
the providing operation provides the first side configured with the liquid outlet;
the regulating using the septum provides a pressure head in the at least one trough flow path at each orifice, for a particular height of liquid in the at least one trough flow path the pressure head is the same at each orifice so that the regulated volumetric flow is at the same flow rate through each orifice and the regulated trough flow velocity is constant all along the flow path into the outlet to efficiently supply clarified liquid from the clarifier.

21. A method for supplying clarified liquid from a clarifier, the method comprising the operations of:

flowing clarified liquid from the clarifier into a trough through rows of orifices, each orifice having the same area; and regulating the flow rate through each orifice by defining a flow path of the trough, the trough flow path extending sequentially over one row then over a next row along a path length, the regulating being by varying an area of the trough flow path along the length, the varying being in direct proportion to values of the length so that the flow of the liquid is at the same volumetric flow rate through each orifice and into the trough flow path and at a constant trough flow velocity all along the trough flow path.

22. A method as recited in claim 21, wherein:

the flowing operation orients the rows parallel to each other; and the regulating operation comprises:

defining a first trough flow path section over only the one row and generally in a first direction;

defining a second trough flow path section separate from the first trough flow path section and only over the next row and in a second direction opposite to the first direction; and defining a trough flow path U-turn between the first and second sections.

23. A method as recited in claim 21, wherein:

in the flowing operation the rows of orifices are spaced from each other;

in the flowing operation the flow is received from the one of the rows of orifices in the first trough flow path section, the first trough flow path section extending in a first direction over the one row of orifices;

the regulating operation further comprises:

expanding a flow area of the first flow path section to maintain the trough flow velocity of the liquid constant in the first trough flow path section as the liquid flows into the first flow path section from successive ones of the orifices of the first row, the expanding of the flow area being in direct proportion to values of the length along the first trough flow path section; and directing the liquid from the first trough flow path section into the second trough flow path section that is in a second direction.

24. A method as recited in claim 23, wherein:

the flowing operation further comprises receiving the flow from the next row of orifices into the second trough flow path section that extends over the next row of orifices; and the directing operation causes the liquid from the first trough flow path section and the received flow from the next row of orifices to flow in the opposite direction alongside the first trough flow path section to expand the flow area of the second trough flow path section and maintain a trough flow velocity of the liquid constant in the second trough flow path section while the liquid flows into the second trough flow path section from successive ones of the orifices of the next row and from the first flow path section.

25. A method as recited in claim 21, wherein:

the flowing operation provides four of the rows of orifices;

the regulating operation defines the flow path extending in two separate sections, each separate section extending in the same direction and over a different one of the rows; and the regulating operation further defines the flow path extending in a third section to simultaneously receive the liquid from the two separate sections and reverse a direction of flow of the flowing liquid to flow in a direction opposite to the same direction so that the combined liquid flow from the two separate sections is in the third section and the third section extends over third and fourth ones of the rows to provide a pressure head in the trough at each orifice, for a particular height of fluid in the trough the pressure head being the same at each orifice.

* * * * *